US011963089B1

(12) United States Patent
Zhou et al.

(10) Patent No.: US 11,963,089 B1
(45) Date of Patent: Apr. 16, 2024

(54) METHOD AND APPARATUS TO PROFILE ACCOUNT CREDENTIAL SHARING

(71) Applicants: AT&T Intellectual Property I, L.P., Atlanta, GA (US); Warner Media, LLC, New York, NY (US)

(72) Inventors: Zhengyi Zhou, Chappaqua, NY (US); Deirdre Paul, Barrington, RI (US); Rakhi Seth-Forrest, Brooklyn, NY (US); Olivia Hong, Bridgewater, NJ (US); Sanjeev Misra, Somerset, NJ (US); Appavu Prakasam, New Providence, NJ (US); Ann Eileen Skudlark, San Ramon, CA (US); Christopher Volinsky, Morristown, NJ (US)

(73) Assignee: Warner Media, LLC, New York, NY (US)

( * ) Notice: Subject to any disclaimer, the term of this patent is extended or adjusted under 35 U.S.C. 154(b) by 377 days.

(21) Appl. No.: 17/492,154

(22) Filed: Oct. 1, 2021

(51) Int. Cl.
*H04W 48/04* (2009.01)
*G06N 20/00* (2019.01)
*H04W 48/10* (2009.01)
*H04W 48/14* (2009.01)

(52) U.S. Cl.
CPC ............ *H04W 48/14* (2013.01); *G06N 20/00* (2019.01); *H04W 48/04* (2013.01); *H04W 48/10* (2013.01)

(58) Field of Classification Search
CPC ..... H04W 48/14; H04W 48/04; H04W 48/10; G06N 20/00
See application file for complete search history.

(56) References Cited

U.S. PATENT DOCUMENTS

| 6,965,881 | B1 | 11/2005 | Brickell et al. |
| 7,272,728 | B2 | 9/2007 | Pierson et al. |
| 7,783,019 | B2 | 8/2010 | Mahone et al. |
| 7,971,237 | B2 | 6/2011 | Caslin et al. |
| 8,230,071 | B1 | 7/2012 | Quilter et al. |

(Continued)

OTHER PUBLICATIONS

"How To Find Your Netflix Freeloader-and Kick Them Out", Wired, https://www.wired.com/story/netflix-hulu-spotify-shared-account-freeloaders/, Jan. 28, 2019, 4.

(Continued)

*Primary Examiner* — Cheikh T Ndiaye
(74) *Attorney, Agent, or Firm* — Bookoff McAndrews, PLLC

(57) ABSTRACT

Aspects of the subject disclosure may include, for example, a system or method that determines, based on consumption data and location information, groups of access portals, where the consumption data and the location information correspond to a time period in which the access portals are used to access a service using an account. The groups can be adjusted according to an intended benefit unit for the service and a sharing structure can be determined including benefit unit partitions for the account based on the adjusting. Factors can be determined, based on the benefit unit partitions, that are indicative of account sharing, as well as weights for the factors by applying a learning model to the consumption data. An intervention strategy can be selected from a group of intervention strategies according to the factors and the weights for the factors. Other embodiments are disclosed.

20 Claims, 12 Drawing Sheets

(56) References Cited

U.S. PATENT DOCUMENTS

| | | | |
|---|---|---|---|
| 8,291,504 B2 | 10/2012 | Padinjareveetil | |
| 8,484,295 B2 | 7/2013 | Chasin et al. | |
| 8,612,768 B2 | 12/2013 | West et al. | |
| 8,661,461 B1 | 2/2014 | Maurer et al. | |
| 8,856,955 B2 | 10/2014 | Hinds et al. | |
| 9,154,497 B1 | 10/2015 | Balzam et al. | |
| 9,405,887 B2 | 8/2016 | Yin et al. | |
| 9,477,826 B2 | 10/2016 | Turgeman et al. | |
| 9,705,877 B2 | 7/2017 | Spaulding | |
| 9,836,598 B2 | 12/2017 | Iyer et al. | |
| 9,876,780 B2 | 1/2018 | Kuper et al. | |
| 9,998,443 B2 | 6/2018 | Cetlur et al. | |
| 10,027,676 B2 | 7/2018 | Tran et al. | |
| 10,033,727 B1 | 7/2018 | Fieldman | |
| 10,080,047 B1 | 9/2018 | Lonstein et al. | |
| 10,154,042 B2* | 12/2018 | Epstein | G06F 21/10 |
| 10,237,624 B2 | 3/2019 | Gerhards et al. | |
| 10,382,416 B1 | 8/2019 | Sokolov et al. | |
| 10,630,729 B2 | 4/2020 | Latham et al. | |
| 10,992,972 B1 | 4/2021 | Zhang et al. | |
| 2004/0236702 A1 | 11/2004 | Fink et al. | |
| 2005/0050365 A1 | 3/2005 | Seki et al. | |
| 2005/0114880 A1 | 5/2005 | Gould | |
| 2007/0097860 A1 | 5/2007 | Rys et al. | |
| 2008/0045234 A1 | 2/2008 | Reed et al. | |
| 2008/0283593 A1 | 11/2008 | He et al. | |
| 2009/0049555 A1 | 2/2009 | Cho et al. | |
| 2009/0300773 A1 | 12/2009 | Pal | |
| 2010/0043081 A1 | 2/2010 | Kiayias et al. | |
| 2011/0004893 A1 | 1/2011 | Borislow et al. | |
| 2012/0047583 A1 | 2/2012 | Nyemahame et al. | |
| 2012/0084828 A1 | 4/2012 | Rowe et al. | |
| 2015/0067804 A1 | 3/2015 | Maxwell | |
| 2016/0373442 A1 | 12/2016 | Bruch et al. | |
| 2017/0111370 A1 | 4/2017 | Ng et al. | |
| 2018/0124065 A1 | 5/2018 | Jurgenson et al. | |
| 2018/0288066 A1 | 10/2018 | Brockhuus et al. | |
| 2019/0096366 A1 | 3/2019 | Akae et al. | |
| 2019/0253382 A1 | 8/2019 | Ramaraj et al. | |
| 2020/0288201 A1 | 9/2020 | Bai et al. | |
| 2021/0248623 A1* | 8/2021 | Scheidiger | G06N 7/01 |
| 2022/0264185 A1 | 8/2022 | Zhou et al. | |

OTHER PUBLICATIONS

"How to Share Your Online Accounts the Safe Way", Wired, https://www.wired.com/story/share-online-accounts-without-sharing-password/, Feb. 23, 2020, 5 pgs.

Hwang, Seong-Seob et al., "Account-Sharing Detection Through Keystroke Dynamics Analysis", International Journal of Electronic Commerce 14.2 (2009): 109-126., Jan. 1, 2009, 28pgs.

Jiang, Jyun-Yu et al., "Identifying Users behind Shared Accounts in Online Streaming Services", The 41st International ACM SIGIR Conference on Research Development in Information Retrieval. 2018., Jul. 8, 2018, 10pgs.

* cited by examiner

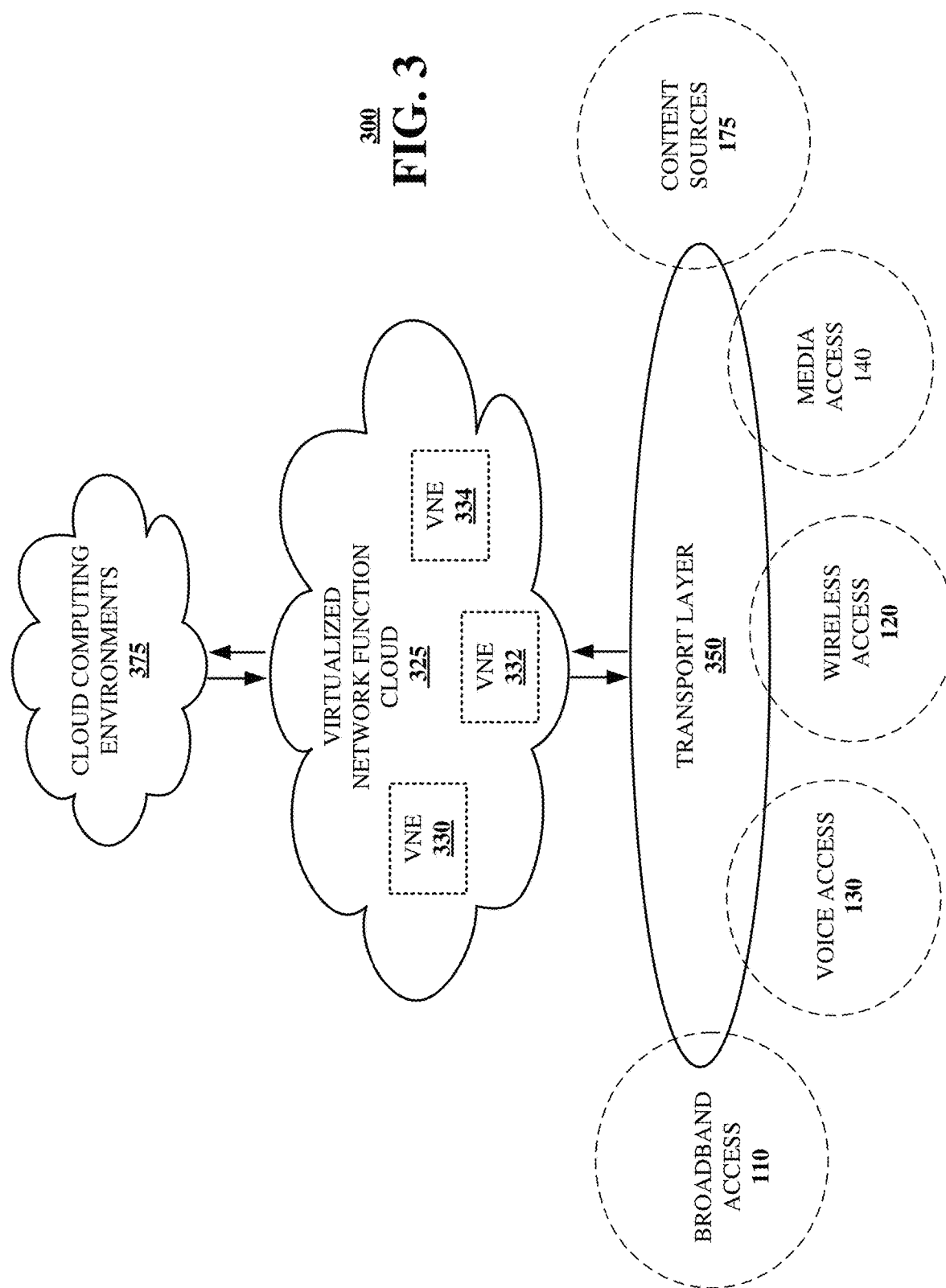

| | Factor 1: Average # benefit units in the last 6 months Weight 1: 0.13 | Factor 2: % consumption that is concurrent across benefit units Weight 2: 0.07 | ... | Factor N: Sharing displays viral spread, boolean 0 or 1 Weight N: 0.25 |
|---|---|---|---|---|
| Account 1 | 1 | 0.04 | | 0 |
| Account 2 | 1.5 | 0.24 | | 0 |
| ... | | | | |
| Account M | 6 | 0.98 | | 1 |

METHOD AND APPARATUS TO PROFILE ACCOUNT CREDENTIAL SHARING

FIELD OF THE DISCLOSURE

The subject disclosure relates to a method and apparatus to profile account credential sharing such as in services.

BACKGROUND

Many enterprises have a business model that is susceptible to account sharing. These businesses offer some benefits (e.g., entertainment, instructions, or purchases), potentially in exchange for fees. Customers create "accounts" and a business defines the intended benefit unit associated with each of these accounts (e.g., an individual, a household, or a community like a company or a school). Customers may log in to their accounts via an authentication process to consume their benefits, but unfortunately it is often possible to share their credentials, intentionally or unintentionally, beyond the benefit unit intended by the business.

As an example, Over-The-Top (OTT) video services can deliver digital content directly through the internet and is a rapidly growing industry. Typically, a subscription fee allows for content consumption that is intended to be limited to members of the immediate household only. However, there is growing concern regarding account sharing, which may occur when unauthorized viewers outside of the subscribing household obtain the subscriber's account identification and password to access content. This can be intentional (e.g., when account owners give out credentials to friends and family outside of the household) or unintentional (e.g., when credentials are stolen, hacked, or shared beyond network). Account sharing can compromise personal data security and/or legitimate content distribution. It can also represent a lost opportunity for revenue.

In some instances, allowing account sharing may have been a conscious decision of some providers of OTT services to gain future subscribers. However, for providers trying to prevent account sharing (e.g., access which is not in compliance with the subscriber agreement) some OTT streaming video services try to mitigate it through measures such as: (1) limiting the number of devices per account, (2) limiting the number of concurrent viewing streams, (3) device logout, and/or (4) password reset. However, these measures can be inadequate at combating account sharing. The number of devices and concurrent streams can be inaccurate indicators of sharing: an account with two devices may be account sharing, while another account may have ten devices all from the same household. Device logout and password reset may not be successful if the actual password is intentionally shared or hacked, and moreover, these approaches can annoy customers and lead to incremental customer loss. Detecting account sharing can be challenging because current providers of OTT services typically may not have a high enough level of confidence that the account sharing either is authorized or is unauthorized and outside of the household.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

FIG. 9 depicts an illustrative embodiment of account sharing profiling that can be generated in accordance with various aspects described herein.

DETAILED DESCRIPTION

Figure 1:
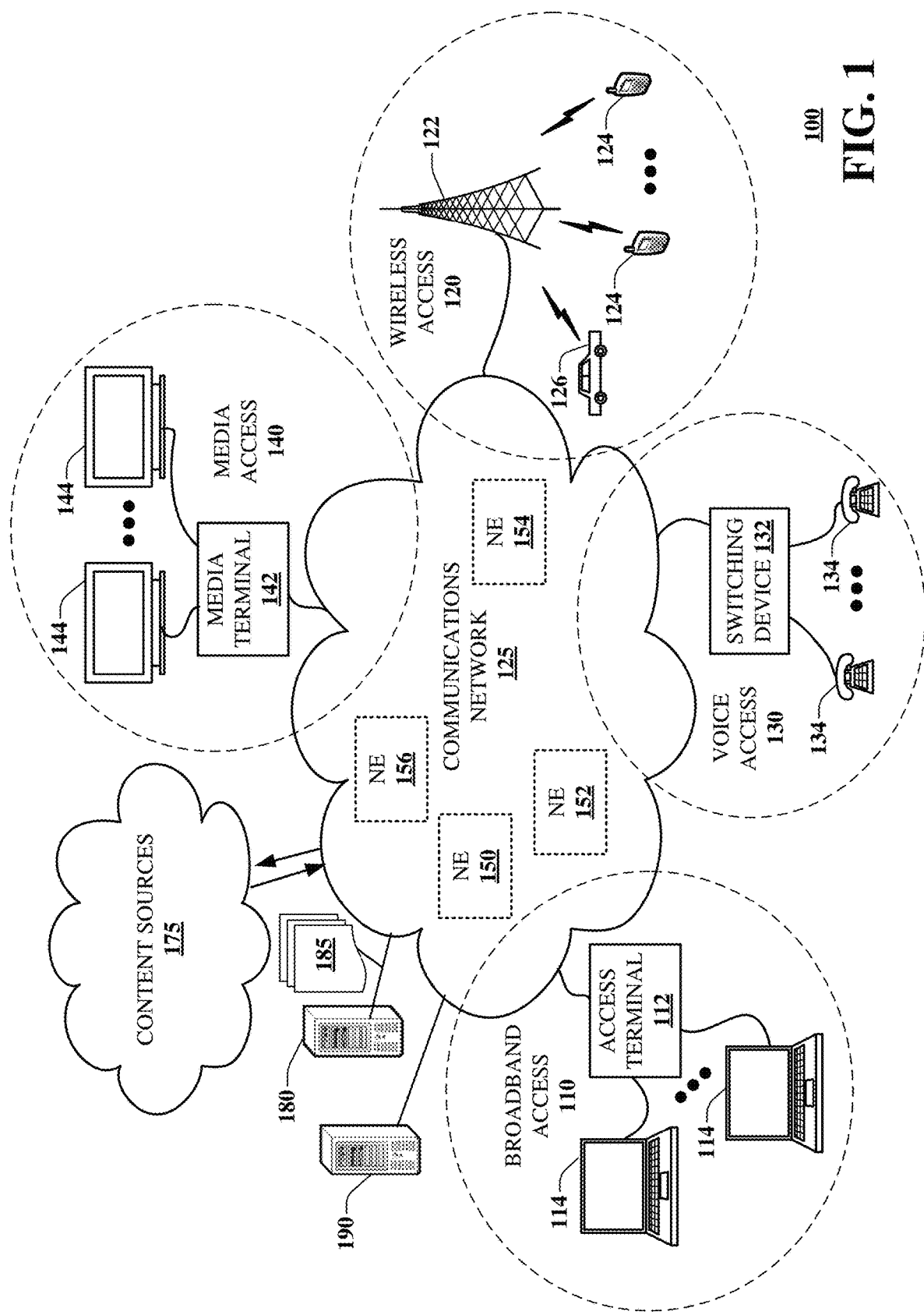
FIG. 1 is a block diagram illustrating an exemplary, non-limiting embodiment of a communications network in accordance with various aspects described herein.

The subject disclosure describes, among other things, illustrative embodiments for profiling account credential sharing and/or mitigating such actions. The exemplary embodiments can be applied to various businesses or entities that utilize accounts, including streaming services, e-commerce, online education, exercise classes, and so forth. The profiling can be based on various intended benefit units including individual, household, community, school, office, and so forth, including combinations of these intended benefit units. The profiling can analyze the sharing including the severity and/or the nature of the sharing, and can facilitate selecting or generating mitigation actions, such as based on the severity and/or the nature of the sharing. The profiling can be performed for sharing based on connections to the service, such as access portals, and locations, such as GPS coordinates, as well as based on other information including identification of devices, IP addresses, social media information, and so forth. Various combinations of this information can be utilized for analyze the sharing including the severity and/or the nature of the sharing.

One or more aspects of the subject disclosure can be a method that includes monitoring over a time period for an account of a service, by a processing system including a processor, consumption data for access portals and corresponding location information for each of the access portals that are used to access the service using the account. The processing system can determine, based on the location information, groups of the access portals according to the monitoring. The method can include adjusting, by the processing system, the groups according to an intended benefit unit for the service. The method can include determining, by the processing system, a sharing structure including benefit unit partitions for the account based on the adjusting. The method can include determining, by the processing system and based on the benefit unit partitions, factors indicative of account sharing by applying a learning model to the consumption data. The method can include determining, by the processing system using the learning model, weights for the factors. The method can include computing, by the processing system, a weighted sum of the factors. The method can include determining, by the processing system, a severity category for the account according to the weighted sum of the factors. The method can include selecting, by the processing system, an intervention strategy from a group of intervention strategies according to the severity category. The methods described herein allow for inferring sharing nature or needs by way of segmentation, clustering and/or filtering. As described herein, the methods allow businesses to further investigate the nature of sharing for any account (e.g., occasional vs persistent vs stable vs on a path to fraud, and so forth) and further enables businesses to segment user groups based on different sharing natures and needs so that the business can more effectively and more efficiently develop and gauge market/impact for marketing actions and/or mitigation actions such as targeted treatments, offers, strategies, and products.

One or more aspects of the subject disclosure can include a device having a processing system including a processor; and a memory that stores executable instructions that, when executed by the processing system, facilitate performance of operations. The operations include accessing consumption data for access portals and corresponding location information for each of the access portals that are used to access a service using an account over a time period. The operations include determining, based on the consumption data and the location information, groups of the access portals. The operations include adjusting the groups according to an intended benefit unit for the service. The operations include determining a sharing structure including benefit unit partitions for the account based on the adjusting. The operations include determining, based on the benefit unit partitions, factors indicative of account sharing and weights for the factors by applying a learning model to the consumption data. The operations include selecting an intervention strategy from a group of intervention strategies according to the factors and the weights for the factors. The device allows for inferring sharing nature or needs by way of segmentation, clustering and/or filtering so that businesses can segment user groups based on different sharing natures and needs in order to more effectively and more efficiently develop and gauge market/impact for marketing actions and/or mitigation actions, as described herein.

One or more aspects of the subject disclosure can include a non-transitory machine-readable medium, comprising executable instructions that, when executed by a processing system including a processor, facilitate performance of operations. The operations include determining, based on consumption data and location information, groups of access portals, wherein the consumption data and the location information correspond to a time period in which the access portals are used to access a service using an account. The operations include adjusting the groups according to an intended benefit unit for the service. The operations include determining a sharing structure including benefit unit partitions for the account based on the adjusting. The operations include determining, based on the benefit unit partitions, factors indicative of account sharing and weights for the factors by applying a learning model to the consumption data. The operations include selecting an intervention strategy from a group of intervention strategies according to the factors and the weights for the factors. The operations allow for inferring sharing nature or needs by way of segmentation, clustering and/or filtering so that businesses can more effectively and more efficiently develop and gauge market/impact for marketing actions and/or mitigation actions, as described herein.

One or more embodiments described collecting or otherwise accessing information indicating connection patterns such as Internet Protocol (IP) addresses being utilized by communication devices for communication services over a time period, where the communication devices use a same credential of a single account for accessing the communication services. Hubs can be identified according to groups of the communication devices that exhibit a particular sharing pattern such as having used the one or more common IP addresses. A prediction or estimation that the single account is engaging in sharing activity can be made based on an analysis of the hubs, such as based on a number of the hubs.

The capability of one or more embodiments described herein of detecting account sharing can be of significant value to a provider of communication services, such as OTT companies, e-commerce enterprises, hospitality services, exercise services, educational services, or other businesses that provide accounts and enable accessing services or products associated with the account, to proactively recover lost revenue, design smarter business rules, and/or combat fraud. In one or more embodiments, the ability to identify a higher likelihood of account sharing provides providers (e.g., OTT companies) with the ability to protect against those that demonstrate high risk behaviors associated with account sharing without impacting legitimate users, facilitating a better consumer experience. Other embodiments are described in the subject disclosure.

One or more aspects of the subject disclosure can be a method in which monitoring over a time period is performed by a processing system including a processor, where the monitoring is of IP addresses being utilized by a plurality of communication devices for OTT streaming services, and where the plurality of communication devices use a same credential of a single account for accessing the OTT streaming services. The method can include determining, by the processing system, groups of communication devices of the plurality of communication devices that have used one or more common IP addresses when accessing the OTT streaming services during the time period. The method can include identifying, by the processing system, hubs according to the groups of communication devices that have used the one or more common IP addresses. The method can include comparing, by the processing system, a number of the hubs to a hub threshold. The method can include predicting, by the processing system, that the single account is engaging in sharing activity based on the comparing. The method can include performing a sharing mitigation action in response to a prediction that the single account is engaging in the sharing activity.

One or more aspects of the subject disclosure can include a machine-readable medium, comprising executable instructions that, when executed by a processing system including a processor, facilitate performance of operations. The operations can include accessing information indicating IP addresses being utilized by a plurality of communication devices for communication services over a time period, where the plurality of communication devices use a same credential of a single account for accessing the communication services. The operations can include determining, from the information, groups of communication devices of the plurality of communication devices that have used one or more common IP addresses when accessing the communication services during the time period. The operations can include identifying hubs according to the groups of communication devices that have used the one or more common IP addresses. The operations can include adjusting the hubs by adding or removing one or more communication devices from one or more of the hubs resulting in adjusted hubs, where the adjusting is based on a type of device satisfying a device category, consumption history for the one or more communication devices, timing history for when the communication services were accessed during the time period for the one or more communication devices, location information when the communication services were accessed during the time period for the one or more communication devices, or a combination thereof. The operations can include predicting that the single account is engaging in sharing activity based on the adjusted hubs and then performing a sharing mitigation action in response to a prediction that the single account is engaging in the sharing activity.

One or more aspects of the subject disclosure include a device comprising a processing system including a processor, and a memory that stores executable instructions that, when executed by the processing system, facilitate performance of operations. The operations can include accessing information indicating IP addresses being utilized by a plurality of communication devices for communication services over a time period, where the plurality of communication devices use a same credential of a single account for accessing the communication services. The operations can include determining, from the information, groups of communication devices of the plurality of communication devices that have used one or more common IP addresses when accessing the communication services during the time period. The operations can include identifying hubs according to the groups of communication devices that have used the one or more common IP addresses. The operations can include adjusting the hubs by adding or removing one or more communication devices from one or more of the hubs resulting in adjusted hubs, where the adjusting is based on characteristics associated with the communication services that were accessed during the time period. The operations can include predicting that the single account is engaging in sharing activity based on the adjusted hubs.

Referring now to FIG. 1, a block diagram is shown illustrating an example, non-limiting embodiment of a communications network 100 in accordance with various aspects described herein. In one or more embodiments, communications network 100 enables communication services to be provided to various communication devices. As an example, a server 180 operated by a content provider, service provider, or other entity can provide various types of communication services including voice, video, data and/or messaging. For example, one or more servers 180 (only one of which is shown) can provide communication services, such as OTT video streaming 185, to the communications devices via a communications network 125. In one embodiment, the communication services are provided utilizing accounts which require credentials for access, such as usernames (or other account identifiers) and passwords. For instance, a single account can have a credential that includes a username and password, where the credential can be utilized by more than one device to access the communication services (at different times and/or simultaneously).

In one or more embodiments, communications network 100 enables a process to be implemented for predicting, estimating, or determining sharing activity associated with the single account. This process can be performed for any number of accounts and/or performed for more than one communication service. For example, a server 190 (or the server 180 managing the communication service) can perform the process. For instance, information can be accessed indicating IP addresses being utilized by a plurality of communication devices for communication services over a time period, where the plurality of communication devices use a same credential of a single account for accessing the communication services. A determination can be made, from the information, of groups of communication devices of the plurality of communication devices that have used one or more common IP addresses when accessing the communication services during the time period. Hubs can be identified according to the groups of communication devices that have used the one or more common IP addresses. A prediction that the single account is engaging in sharing activity can be made based on the adjusted hubs. In one embodiment, the hubs can be adjusted by adding or removing one or more communication devices from one or more of the hubs resulting in adjusted hubs, where the adjusting is based on characteristics associated with the communication services that were accessed during the time period.

The communications network 125 can provide broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text, and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over internet protocol (VoIP) network, internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway, or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the internet and other public networks as well as one or more private networks, for managing subscriber access, for billing and network management and for supporting other network functions.

Figure 2A:
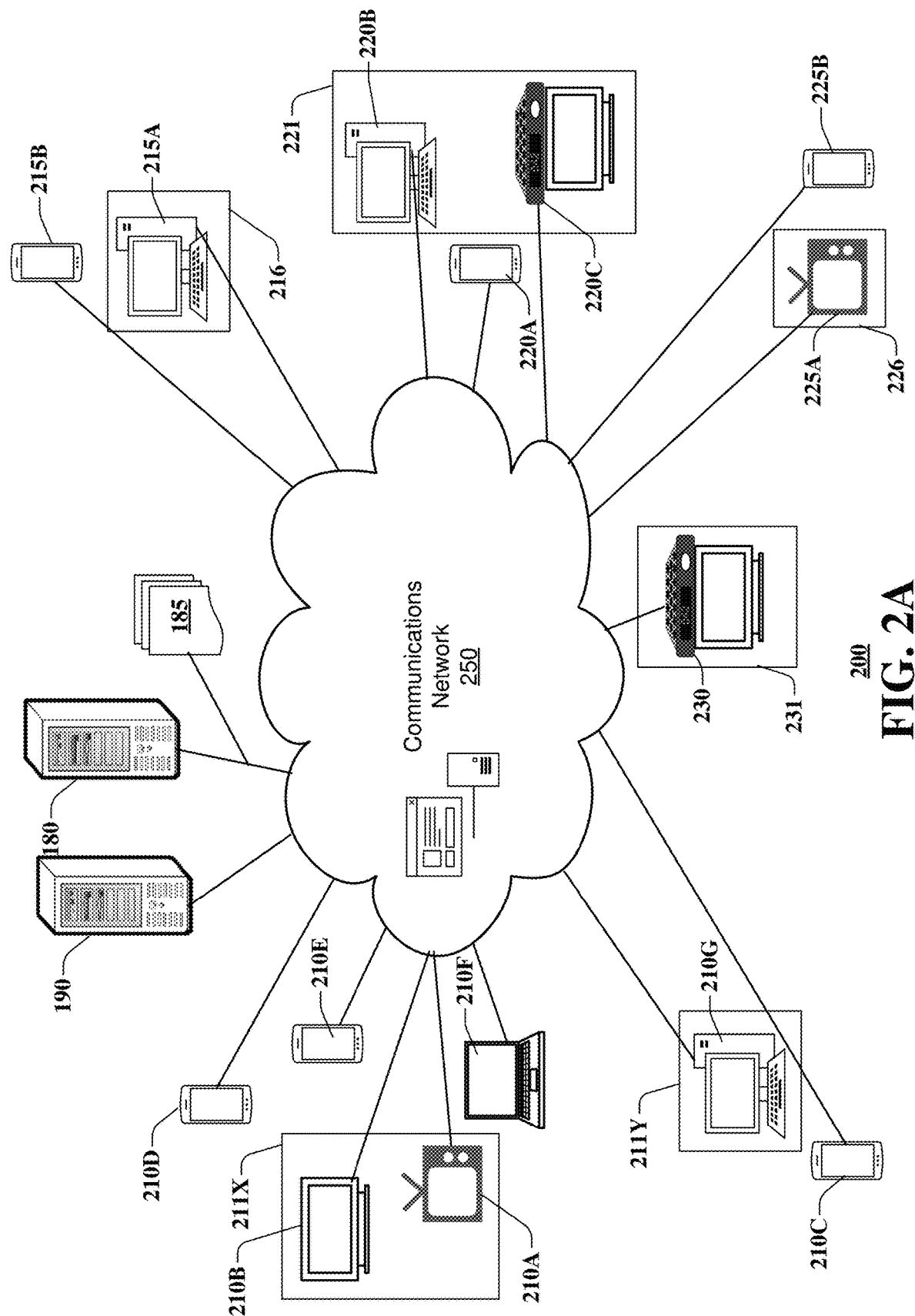
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network 100 of FIG. 1 in accordance with various aspects described herein. System 200 can include various devices that facilitate providing communication services including communication devices 210A-210G (collectively referred to as 210), 215A-215B (collectively referred to as 215), 220A-220C (collectively referred to as 220), 225A-225B (collectively referred to as 225), and 230, which can be of various types including mobile devices, stationary devices, smartphones, set top boxes, media processing devices, gaming consoles, televisions, desktop computers, laptop computers, personal digital assistants, or other computing devices that can present communication services to a user. The communication devices of system 200 can be located in various locations (e.g., residence, business premises, public premises such as a library, retail premises such as an internet café, travel facilities such as an airport, outdoors and so forth) such as communication devices 210A, 210B at location 211X, communication device 210G at location 211Y, communication device 215A at location 216, communication devices 220B, 220C at location 221, communication device 225A at location 226, and communication device 230 at location 231. Also, the locations of some of the communication devices of system 200 can change such as for mobile phones, laptop computers, other mobile devices, and so forth. Any number of communication devices can be included in system 200.

In one or more embodiments, system 200 enables communication services to be provided to the communications devices 210, 215, 220, 225, 230. The type of communication services can vary including voice, video, data, gaming, and/or messaging. For example, a content provider or other entity can provide communication services, such as OTT video streaming 185, to the communications devices 210, 215, 220, 225, 230 via the one or more servers 180 (only one of which is shown) over a communications network 250. The communications network 250 can include various devices to facilitate providing and managing the communication services including devices (e.g., network elements) described with respect to system 100 of FIG. 1 or devices described with respect to other embodiments herein.

Figure 2B:
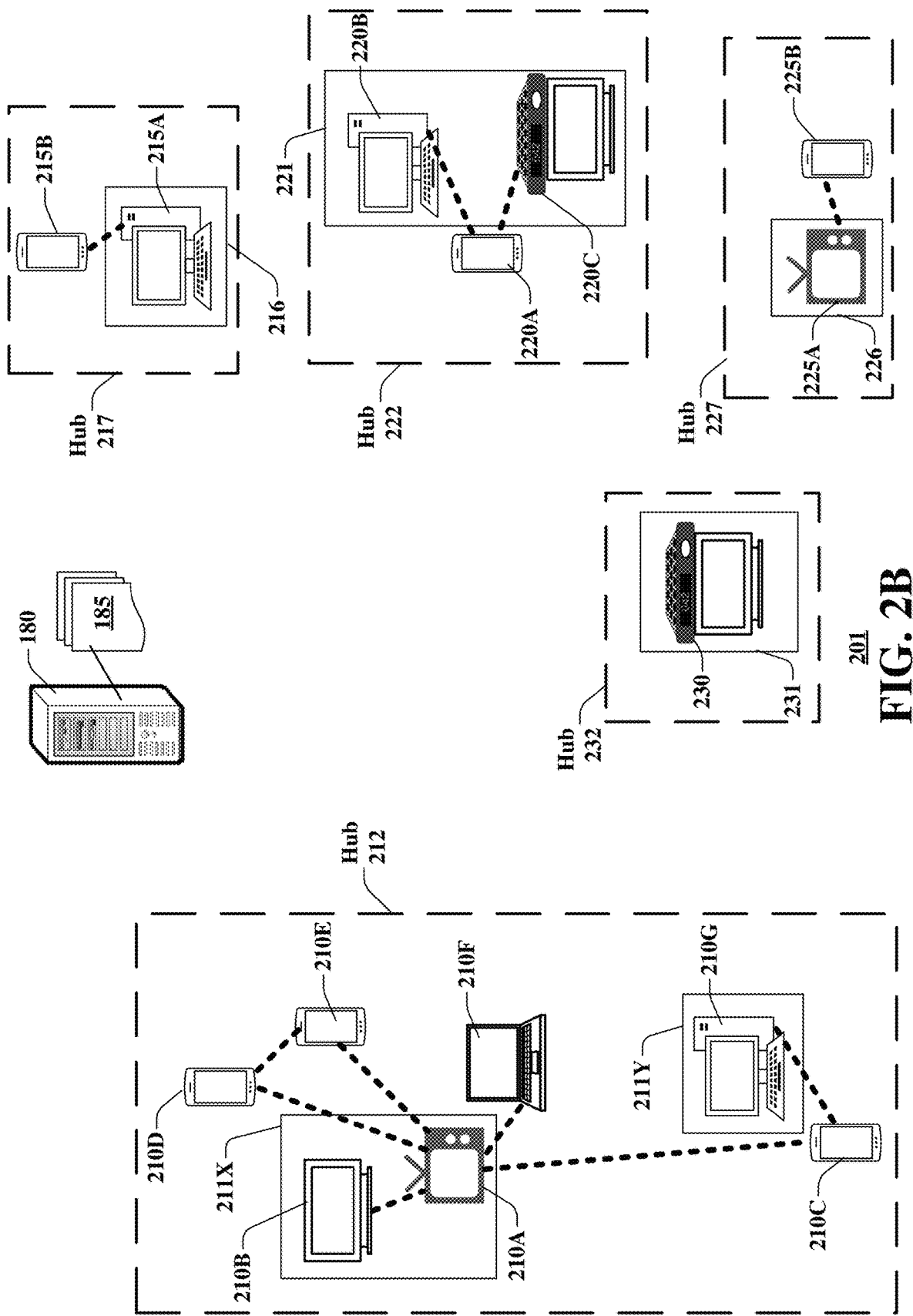
FIG. 2B is a block diagram illustrating an example, non-limiting embodiment of a mapping of devices utilizing a service within the system of FIG. 2A in accordance with various aspects described herein.

Referring additionally to FIG. 2B, the communication devices are shown in a mapping 201 according to being categorized or otherwise grouped together into hubs 212, 217, 222, 227, 232. While five hubs are shown, any number of hubs of one or more and/or any number of devices of one or more within a hub can exist based on the monitored connection patterns of the communication devices that are utilizing the particular account for the particular service during a particular time period. In one or more embodiments, each account's devices can be grouped into hubs, where a hub represents devices that have a relationship based on connectivity patterns to one or more other devices in the same hub as described herein. For example, a hub can be an estimation or approximation of a household. In one embodiment, for each account, the number of hubs can be determined, as well as a determination made as to which communication devices belong to which hubs. The number of hubs for an account can be indicative of sharing activity, such as at or above a threshold number of hubs. The hub threshold can be determined in a number of different ways including analysis of other accounts to determine an average number of hubs. The hub threshold can vary based on a number of factors, such as geographic location, type of communication service, type of account, particular provider, and so forth.

Figure 2C:
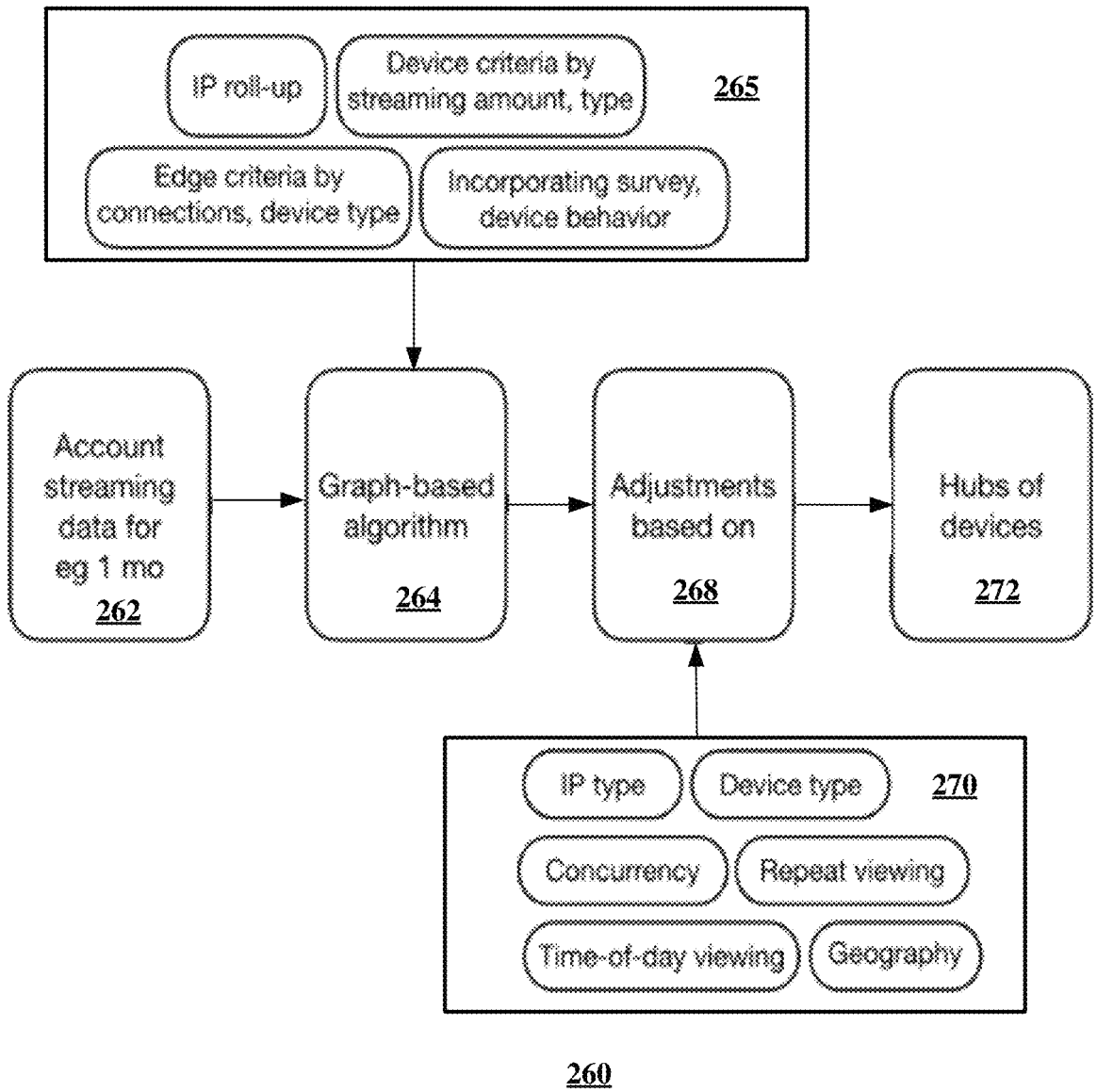
FIG. 2C depicts an illustrative embodiment of a method in accordance with various aspects described herein.

Referring additionally to FIG. 2C, a method 260 can be performed (e.g., by the server 180, server 190, and/or some other device) which can generate or otherwise identify the hubs as shown in the mapping 201. For example, method 260 can be or can utilize an algorithm (e.g., a graph-based algorithm) followed by an adjustment step which can be performed for any number of communication services that utilize accounts and/or credentials, as well as performed for any number of accounts for the same or different communication services. It should be understood that various types or combinations of types of algorithms can be utilized to identify hubs and is not limited to a graph algorithm, such as growing a list or grouping algorithms.

At 262, account streaming data over a particular time period (e.g., a pre-determined window such as one month, although other time periods can be used) can be collected. The particular type of data can vary and can include IP addresses, identification of streamed content, time of streaming, and so forth. In one embodiment, location information for the devices during streaming can be collected when available. At 264, a categorization of devices utilizing accounts can be performed, such as creating a graph or mapping for each account with the devices that have utilized the account for accessing the particular service in the relevant time period being nodes. An inference or estimation can be made that a group of devices belonging to a particular hub is from a same household according to the evidence of connectedness (e.g., pairs of devices utilizing at least one common IP address during the relevant time period). It should be understood that in one or more embodiments, a household (e.g., a hub) may not be a single location such as a single residence. In this example, different hubs do not share any device or any IP address at all, and they are estimated or inferred to be from different households. Although, as described herein, there can be different hubs that are determined or predicted to be of a single household, such as a desktop computer located at a place of work of a user being in one hub and other devices of the user (some of which can be located at a residence and others such as mobile devices having varying locations) being in another hub.

The categorization can be based on various categorization factors or combinations of categorization factors as in 265 including IP address roll-up such as only particular digits of the IP address are analyzed (e.g., IP addresses can be rolled up to the first three octets, since the fourth octet is usually the subnet). Another factor can be a device criteria based on streaming amount such as a minimum number of streaming sessions and/or a minimum amount of time streaming (e.g., the number of streaming sessions and/or the amount of time streaming as compared to thresholds that can be adjustable). Another factor can be streaming type such as video streaming, gaming, and so forth. Another factor can be edge criteria based on connections such as number of connections and/or number of times a common IP address was shared. For example, the number of shared connections required to form an edge can be adjustable, such as one, two, three, or another number greater than three. Another factor can be edge criteria based on device type, such as only fixed devices, only devices that are video streaming, all devices that utilize a particular communication service that is being monitored, and so forth. Another factor can be self-reported sharing information which can be utilized to further assess devices that belongs to hubs, adjust the threshold(s) such as minimum amount of streaming or number of IP connections shared, and/or improve the algorithm by incorporating the self-reported sharing information. Another factor can be based on device behavior, such as matching device behavior within a hub. As explained herein, these categorizations factors can be adjustable including changing a streaming amount threshold for a device to be included in any hub and/or changing the number of times that a pair (or other number) of devices must share a common IP address to be included in the same hub.

In one embodiment to generate the mapping 201, if two devices have been observed to use at least one common IP address (the threshold can be adjusted) during the same time window, an edge can be added to these two nodes. In this example, each connected component of the completed graph can be a hub. For instance, a hub can be a group of devices observed to connect with the same group of IP addresses. The dashed lines between pairs of communication devices in FIG. 2B represents the use of a common IP address (which can be based on a minimum number of connections and/or a minimum number of common IP addresses utilized) during the same time window by the pair of devices. As can be seen in mapping 201, some devices may utilize at least one common IP address with a single other communication device (e.g., a desktop computer 210G utilizing at least one common IP address with smartphone 210C), while other devices may utilize at least one common IP address with multiple other communication devices (e.g., IP enabled television 210A utilizing at least one common IP address with IP enabled television 210B, smartphones 210C, D, E, and laptop 210F. As can also be seen in mapping 201, IP enabled television 210A does not utilize at least one common IP address with desktop computer 210G, but the desktop computer 210G is included within the hub 212 as a result of a common IP address utilization for the service (during the relevant time period) with smartphone 210C, as represented by the dashed line between. In one embodiment, the lack of a dashed line between two communication devices (such as within a same hub) can indicate that the two particular devices did not utilize a common IP address during the relevant time period. As can further be seen in mapping 201, a hub can have fixed devices in a single location such as in hub 217 at location 216, hub 222 at location 221, hub 227 at location 226, and hub 232 at location 231. A hub can also have fixed devices in multiple locations such as in hub 212 at location 211X and at location 211Y (of same hub). As explained herein, these different locations can be based on various circumstances, such as a user utilizing one of the communication devices (e.g., smartphone 210C) at a residence and at a vacation home. The locations could be other types as described herein including a business, an IP café, a library, an airport, and so forth. Additionally, as described above, a hub can include any number of devices such as a single set top box 230 in hub 232 or multiple communication devices in each of hubs 212, 217, 222, and 227.

At 268, adjustments can be made to the mapped or otherwise determined hubs shown in mapping 201. These adjustments can be made according to various adjustment factors or combinations of adjustment factors as in 270 including IP type. In one embodiment as to IP type, an IP address can be deemed to be public if more than one account is observed connected to it in the streaming data (e.g., cellular network, coffee shop WiFi). In one embodiment as to IP type, an IP address can be deemed private if only one account is observed connected to it (e.g., private home WiFi). In this example, if all devices in a hub are connected to only public IP addresses, then the hub can be discounted (e.g., removed from mapping or not considered when analyzing the number of hubs). This public IP addresses-only hub may be a hub generated based on the subscribing household connection patterns when they use separate devices and stream away from home (e.g., during commute, during travel such as an airport, or at work). Another factor can be based on device type. For example, the presence of one or more stationary devices, such as media consoles or smart televisions, in different hubs can be indicative that these hubs are from different households. Another factor can be based on concurrent and/or repeat viewing. For example, the presence of concurrent viewing and/or repeat viewing of the same content across different hubs can be indicative that these hubs are from different households. Another factor can be based on time-of-day behaviors. For example, a comparison can be done of the time of day at which streaming takes place across hubs. Very different patterns across hubs, or regular evening or weekend streaming from different hubs can be indicative that these hubs are from different households. Another factor can be based on geography. For example, if hubs (or devices therein) are consistently determined to be far away from one another (e.g., farther than a distance threshold), this can be indicative that these hubs are from different households. In one example, location services (e.g., GPS data) can be utilized to determine where a mobile phone is located when it is utilizing the account during the relevant time period. Continuing with this example, if the mobile phone is of a second hub (i.e., does not utilize a common IP address with any communication devices of a first hub during the relevant time period) and consistently is located more than a threshold away from a location of the first hub (e.g., locations determined for fixed and/or mobile devices of the first hub) then this can be indicative that these hubs are from different households. Another example of geographic determinations is based on the IP addresses. IP addresses can carry geo-location information, so for IP check-ins of a device (which is not limited to mobile devices with GPS), a determination can be made as to where the device is geographically and this information can be used to adjust for the hubs as described herein (although some VPN connections may not allow for this). In another example, the geographic location of a hub can also be detected by the radio cell that the mobile devices of the hub communicate with. If the radio cells are far away between hubs, the hubs are likely from different households.

Based on the mapping or categorization of hubs at 272, method 260 can be used for predicting or estimating sharing activity, such as based on a comparison of number of hubs to a threshold number of hubs. Other analysis of the hubs can also be performed for making the estimation including any location information associated with hubs (e.g., location of hub at a college dormitory or a distance between hubs), streaming frequency associated with the hubs, viewer feedback information associated with the hubs (e.g., viewer feedback indicating that one of the hubs is for a child at college), and so forth. The prediction or estimation of sharing activity can also trigger mitigation actions, such as offering a service upgrade to add friends and family, and so forth.

Method 260 can be repeated for any number of accounts of a communication service. Method 260 can be repeated for different communication services from a same or different provider. In one embodiment, patterns detected from different services (e.g., having different accounts) for the same devices (or at least some overlapping devices) can be utilized as part of predicting or estimating sharing activity.

Method 260, as well as the other embodiments described herein, provide a more efficient method of mitigating sharing activity and/or monitoring for sharing activity. Existing approaches to reduce sharing activity include limiting the number of devices or concurrent streams; and device logout or password resets (e.g., periodic). However, these approaches may not reduce sharing activity, and can be intrusive, as well as ineffective against intentional password sharing where the parties will simply exchange the new password.

Method 260, as well as the other embodiments described herein, provide an intelligent and efficient method of identifying sharing activity. For example, instead of looking at one dimensional attributes such as number of devices, method 260 can make use of the connections between devices and IP addresses (or other connection parameters), and can incorporate further information from IP type, device type, concurrency, repeat viewing, time-of-day, and/or geography. In one or more embodiments, the results of method 260 (e.g., a prediction of sharing activity or no sharing activity per account) can be utilized as factors in policy decisions associated with a particular communication service, such as pricing, types of upgrade packages, and so forth. Method 260 not only predicts or estimates sharing, but also can obtain more insight into the nature of sharing and monitor how sharing evolves over time. For example, the growth of sharing activity can be predicted or estimated utilizing different time periods of monitoring. The growth prediction or estimation can be utilized for determining potential mitigation actions, selecting a particular mitigation action for a particular account, and/or can be a factor in a policy decision with respect to the particular communication service.

In one embodiment, method 260 allows estimating or predicting which devices are using shared credentials (e.g., hubs consistently far away from subscriber's physical address). Then, usage patterns, interests, or likely demographics can be examined and a targeted up-sell or promotion plan can be offered such as via a display on one or more of the devices.

In another embodiment, the examples described with respect to FIGS. 2A-C can determine hubs based on other connection patterns or combination of patterns, such as based on IP addresses and another connection parameter that is being commonly utilized by the devices.

Figure 2D:
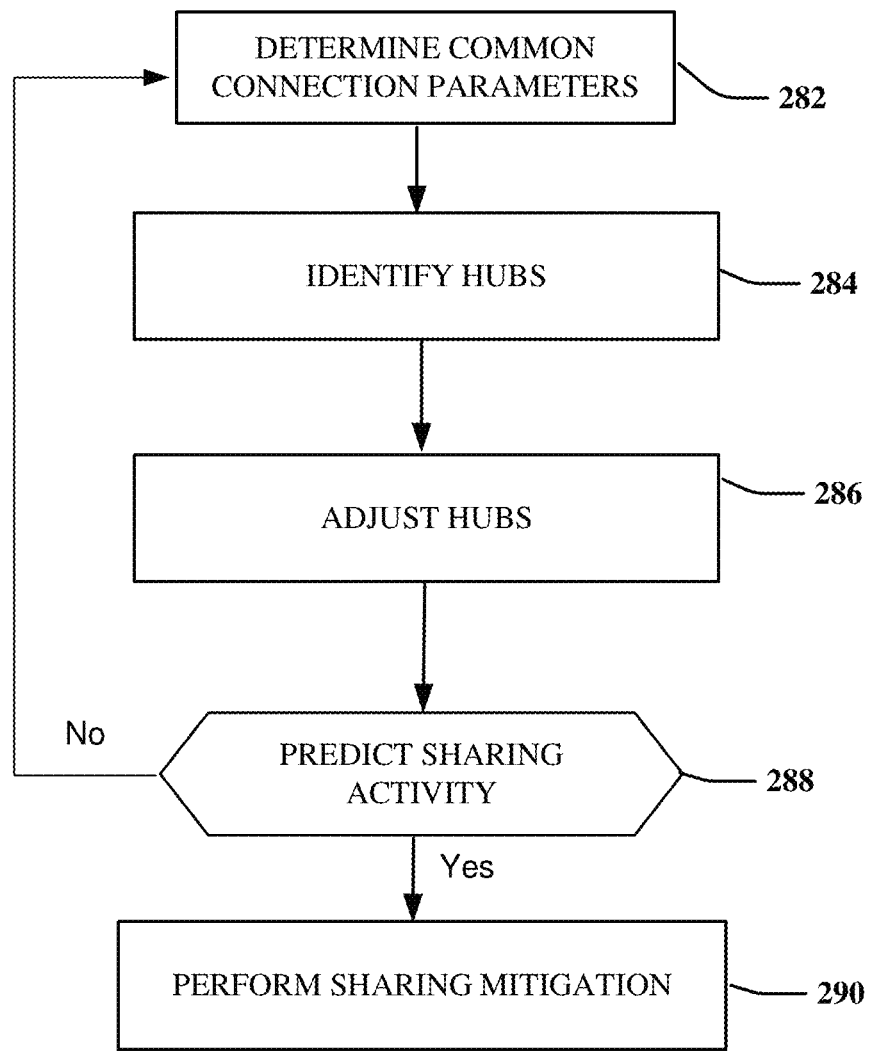
FIG. 2D depicts another illustrative embodiment of a method in accordance with various aspects described herein.

FIG. 2D depicts an illustrative embodiment of a method 280 in accordance with various aspects described herein. The following is described for a single account, however, method 280 can be performed for any number of accounts. At 282, common connection parameters can be determined for devices providing a communication service which utilize a credential and an account for enabling access to the service. For example, where the common connection parameter is IP addresses (although other common parameters can be used), monitoring over a time period can be performed for IP addresses that are being utilized by a plurality of communication devices for a communication service (e.g., OTT streaming services although other services can be monitored). The plurality of communication devices is using a same credential of a single account for accessing the service. A determination can be made as to groups of communication devices of the plurality of communication devices that have used one or more common IP addresses when accessing the services during the time period.

At 284, an identification of hubs can be made according to the groups of communication devices that have used the one or more common IP addresses. At 286, the hubs can be adjusted to improve the prediction or estimation as to households. For example, the adjustment can be adding or removing one or more communication devices from one or more of the hubs resulting in adjusted hubs, where the adjusting is based on characteristics associated with the communication service that was accessed during the time period.

At 288, a prediction can be made that a single account is engaging in sharing activity. For example, the sharing prediction can be based on comparing a number of the hubs to a hub threshold. If it is predicted that there is no sharing activity then method 260 can return to determining common connection parameters, such as based on a different connection parameter or for a different account. If it is predicted that there is sharing activity, then method 260 can proceed to 290 where a sharing mitigation action can be taken.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

One or more of the embodiments described herein provide an effective way to detect different households utilizing single accounts, thereby predicting or detecting sharing behavior. The embodiments described herein can be more accurate at predicting or detecting sharing activity than existing industry solutions. The embodiments described herein can provide insights into the nature of sharing activity and can enables an analysis and targeting of sharing parties.

One or more of the embodiments described herein can work on existing streaming viewership data and do not require extra data gathering, although other data (or other types of data) can be generated, particularly as time passes. One or more of the embodiments described herein do not require large-scale surveying, which can be intrusive and expensive. One or more of the embodiments described herein provide OTT providers with actionable insights. For example, they (or other providers of other communication services) can use the hub information to: identify and stop egregious sharing or fraud; design proactive business rules to limit account sharing and fraud; proactively offer customized or targeted up-sell plans or new account promotion in order to increase or maximize subscribers and revenue; continuously or frequently monitor sharing behavior over time to spot new trends and design preventative measures.

One or more of the embodiments described herein can be applied to other communication services and/or devices, such as those that link via an IP address. One or more of the embodiments described herein can fine tune edges during hub mapping, such as based on requiring two or more instances of common IP addresses; a number of IP addresses in common satisfying a threshold; rolling or unrolling of IP addresses; and so forth. One or more of the embodiments described herein can utilize thresholds that are adjustable for identifying or predicting households, such as the number of common IP addresses that are required or the number of times a common IP address was shared.

One or more of the embodiments described herein can be designed or adjusted to avoid or reduce false positives in predicting sharing activity. This can facilitate maintaining a good or strong relationship with the subscriber. One or more of the mitigation actions taken when sharing activity has been predicted can be selected to maintain a good or strong relationship with the subscriber, such as providing an offer for a family/friends plan upgrade rather than cancelling service or taking another action that may weaken the relationship with the subscriber. In one or more embodiments, the detection of sharing activity can be used in other ways, in addition to or in place of a direct mitigation action for each account, such as changing policies of the communication service.

One or more of the embodiments described herein can be utilized to identify or estimate types of households, such as a college student at a different location from a residence; a vacation home; a lunch break where consumption is at a different location (e.g., business phone at home, personal phone at business or at a coffee shop during lunch). Users can be part of a single household while consuming at different locations such as a user that owns a residence and a vacation home, and so forth. Other information can be utilized to further distinguish between consumption at different locations that is in compliance with the account and subscriber agreement as compared to consumption at different locations that is not in compliance, such as consumption patterns (e.g., timing, type of content), viewer feedback, and so forth.

One or more of the embodiments described herein can utilize thresholds which allow users (e.g., content service providers) to be more lenient or more aggressive in estimating or identifying unauthorized use of credentials. One or more of the embodiments described herein can adjust the process based on location information, such as where there are valid reasons for multiple locations including college kids, vacation homes, and so forth. As described herein, in one embodiment, consumption patterns can indicate that there is a student at college or there is a vacation home (such as detecting similar viewing as at home).

One or more of the embodiments described herein can define hubs based on various detected patterns (over a particular time period) between devices (e.g., various data associated with connections and streaming) which can also be combinations of patterns. These patterns can include common IP addresses as described herein. One or more of the embodiments described herein can utilize a time window which can vary in size, combination of sizes. The time window can also be continuously or periodically repeated.

One or more of the embodiments described herein can utilize the number of hubs for an account to select the particular mitigation action. For example, if the number of estimated hubs for an account is above a first threshold (e.g., acquaintance sharing threshold) but below a second threshold (e.g., egregious or fraudulent threshold), then a mitigation action can be selected in which an offer can be sent (e.g., via email and/or displayed at one or more devices) for a package with more concurrent streaming (e.g., a friends and family plan). In another embodiment, if the number of estimated hubs for the account is above both the first threshold and above the second threshold (e.g., egregious or fraudulent threshold), then a different mitigation action can be selected, such as requiring a password reset (e.g., including monitoring in a subsequent time window if the number of hubs decreases for the account) and/or contacting the subscriber associated with the account.

In another embodiment, predicted or detected patterns (including the number of hubs, locations of hubs, and so forth) can be utilized to change mitigation strategy, including selecting an offer, such as offering a friends and family package or offering a package with more concurrent streaming numbers allowed.

One or more of the embodiments described herein can utilize the number of hubs, the growth of the number of hubs (over different time periods), frequency of changes to the devices within a hub(s) and/or other factors (e.g., location data, consumption history, timing of consumption, and so forth) to distinguish between predicted sharing activity that is intentional sharing vs. fraudulent. For instance, an account having an extremely large number of hubs (e.g., greater than a fraudulent threshold), such as where the number of hubs is determined to be too large to be users sharing with friends and family, can be subject to a mitigation action that involves resolving fraud (e.g., a stolen password). In another embodiment, the stability of hubs of an account (over different time periods) can be a factor in distinguishing between predicted sharing activity that is intentional sharing vs. fraudulent, such as frequently changing hubs and/or frequently changing devices being indicative of fraud (e.g., a stolen password).

One or more of the embodiments described herein can provide upgrade offers (e.g., upgrade to family and friends package) in various ways such as emails or displaying at one or more devices. For example, the offers can be sent to one, some or all devices of: all hubs or selected hub(s) (e.g., a single most active hub, the most active hubs, a single hub with the most devices, or the hubs with the most devices).

As connection technology changes including any future changes to IP addresses, one or more of the embodiments described herein can continue to determine patterns with respect to the use of the future connection technology and/or future changes to IP addresses (e.g., detecting patterns provided that random IP addresses are not being utilized).

One or more of the embodiments described herein can detect other patterns, such as GPS signals showing locations (e.g., in conjunction with IP addresses). In one embodiment, the patterns can be based on any characteristic or parameter that identifies a connection point so that devices can be determined to be part of a household, such as co-located (e.g., within a house), although as described herein a household can include different locations.

One or more of the embodiments described herein can adjust a mitigation action where it is determined that one or more of the hubs have other accounts or subscriber agreements associated with the hub (e.g., a user could be at friend's house but chooses to use own account rather than friend's account for streaming a video). In this example, the adjustment to the mitigation action can be cancelling an action to send a friends and family package offer or cancelling sending a warning notice.

One or more of the embodiments described herein can be applied to any streaming service, and/or other communication services including gaming services. One or more of the embodiments described herein can predict or estimate sharing activity based on hubs with or without utilizing location data and/or with or without utilizing subscriber information.

One or more of the embodiments described herein can identify a main hub, associated hubs, and/or non-associated hubs. For example, a number of devices within a hub (e.g., the hub with largest number of devices), subscriber information, location information, IP type, and/or device type can be utilized in the identification. Other information can also be utilized to facilitate determining the main hub, associated hubs, and/or non-associated hubs, such as consumption patterns (e.g., timing, type of content), viewer feedback, and so forth.

One or more of the embodiments described herein can identify or estimate hubs based on a determination of an address type for one or more common IP addresses, where the address type includes a public address and a private address, where the determination of the public address for a particular IP address of the one or more common IP addresses is based on a plurality of accounts (e.g., satisfy a public threshold) utilizing the particular IP address when accessing the communication services during the relevant time period, and where the determination of the private address for a particular IP address of the one or more common IP addresses is based on a single account (or less than a private threshold such as three or less) utilizing the particular IP address when accessing the communication services during the relevant time period. It can be significant to detect and monitor account sharing to ensure the privacy of users' account data and/or to prevent potential revenue loss for organizations.

Referring now to FIG. 3, a block diagram 300 is shown illustrating an example, non-limiting embodiment of a virtualized communication network in accordance with various aspects described herein. In particular, a virtualized communication network is presented that can be used to implement some or all of the subsystems and functions of communication network 100, the subsystems and functions of system 200, and methods 260, 280 presented in FIGS. 1, 2A, 2B, 2C, 2D. For example, virtualized communication network 300 can facilitate in whole or in part collecting or otherwise accessing information indicating connection patterns such as IP addresses being utilized by communication devices for communication services over a time period, where communication devices use a same credential of a single account for accessing the communication services. Hubs can be identified according to groups of the communication devices that exhibit a particular sharing pattern such as having used the one or more common IP addresses. A prediction or estimation that the single account is engaging in sharing activity can be made based on an analysis of the hubs, such as based on a number of the hubs.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
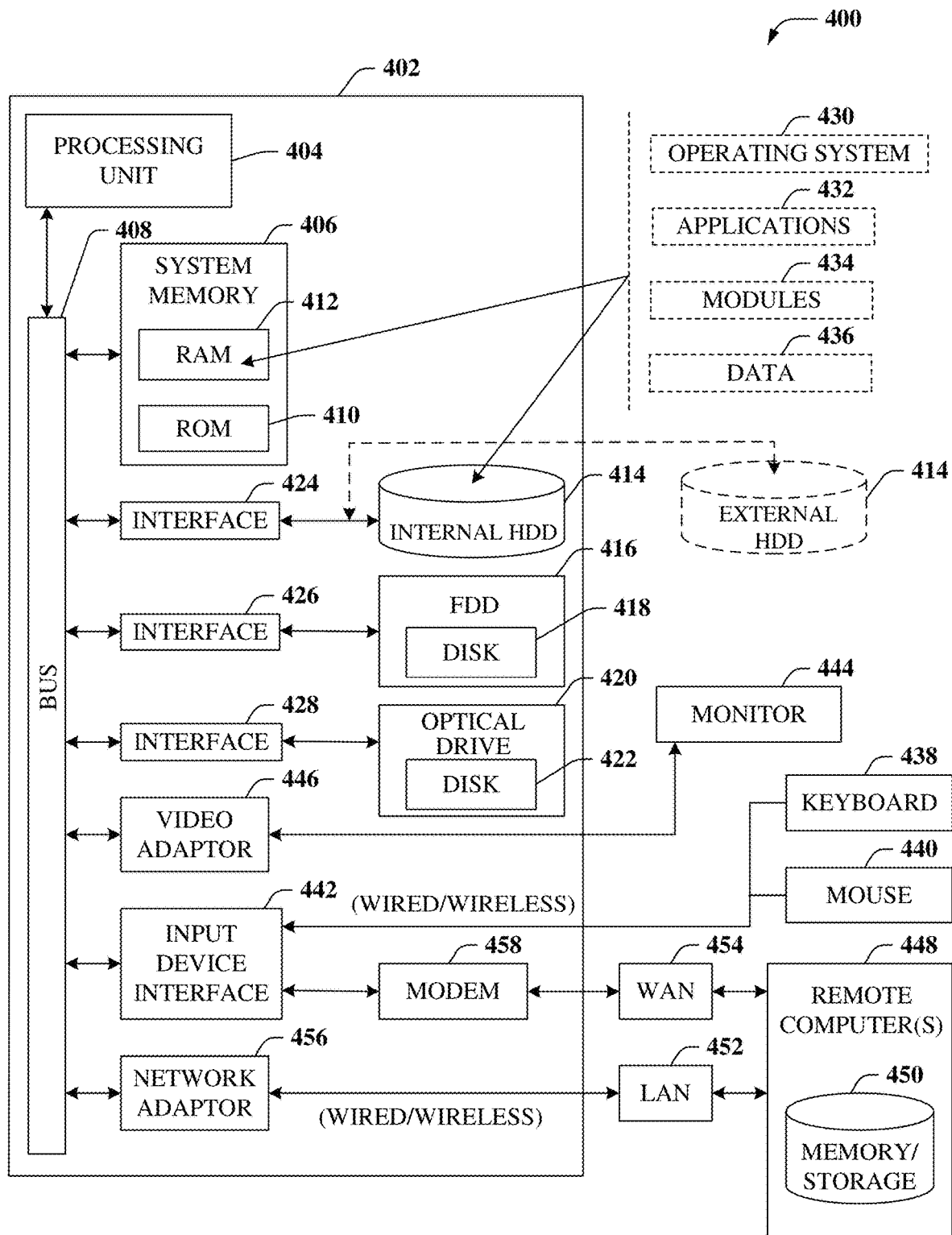
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part collecting or otherwise accessing information indicating connection patterns such as IP addresses being utilized by communication devices for communication services over a time period, where communication devices use a same credential of a single account for accessing the communication services. Hubs can be identified according to groups of the communication devices that exhibit a particular sharing pattern such as having used the one or more common IP addresses. A prediction or estimation that the single account is engaging in sharing activity can be made based on an analysis of the hubs, such as based on a number of the hubs.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smartphone, a tablet computer, etc.) for receiving display information associated with computer 402 via any communication means, including via the internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
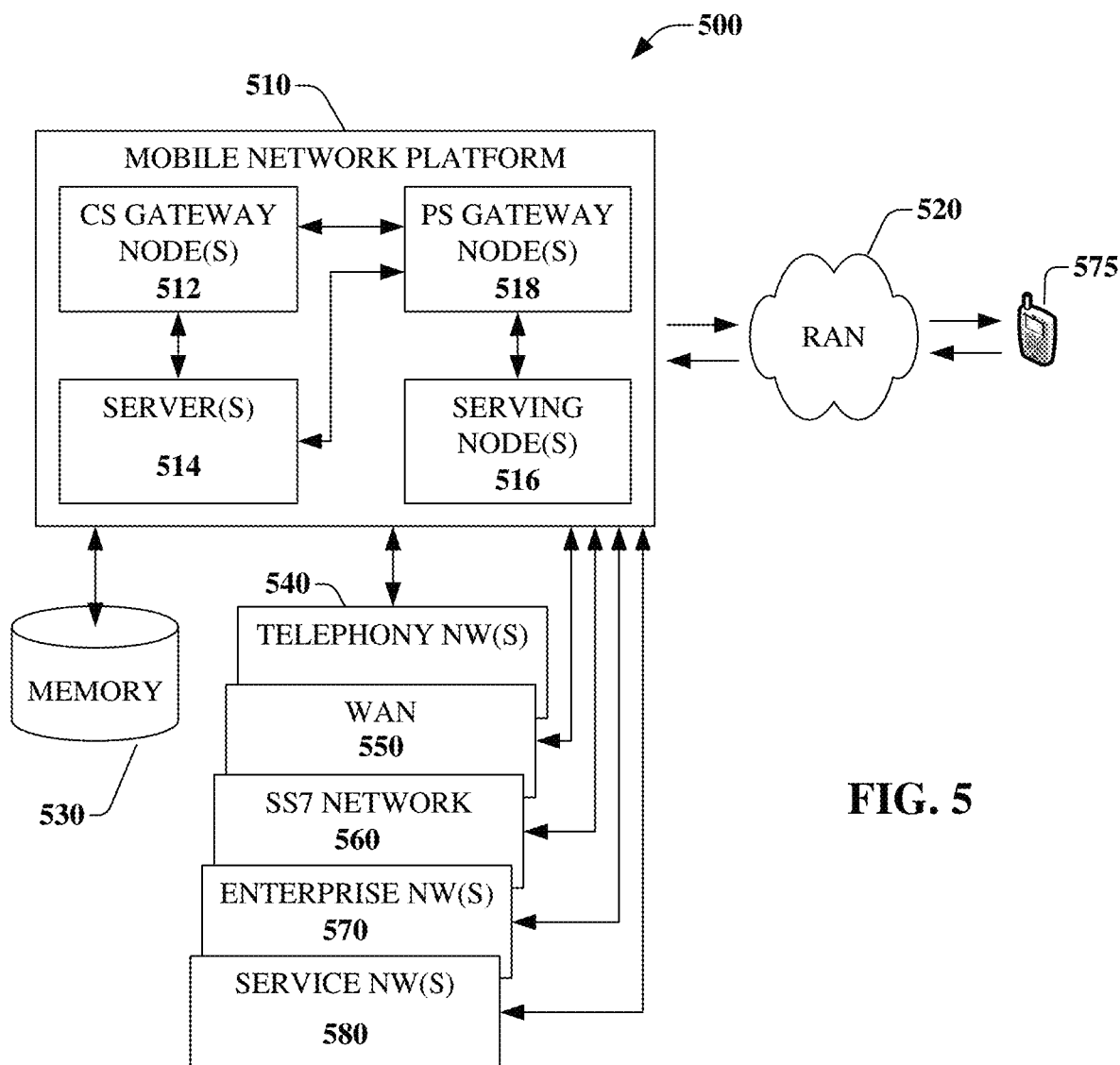
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part collecting or otherwise accessing information indicating connection patterns such as IP addresses being utilized by communication devices for communication services over a time period, where communication devices use a same credential of a single account for accessing the communication services. Hubs can be identified according to groups of the communication devices that exhibit a particular sharing pattern such as having used the one or more common IP addresses. A prediction or estimation that the single account is engaging in sharing activity can be made based on an analysis of the hubs, such as based on a number of the hubs.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
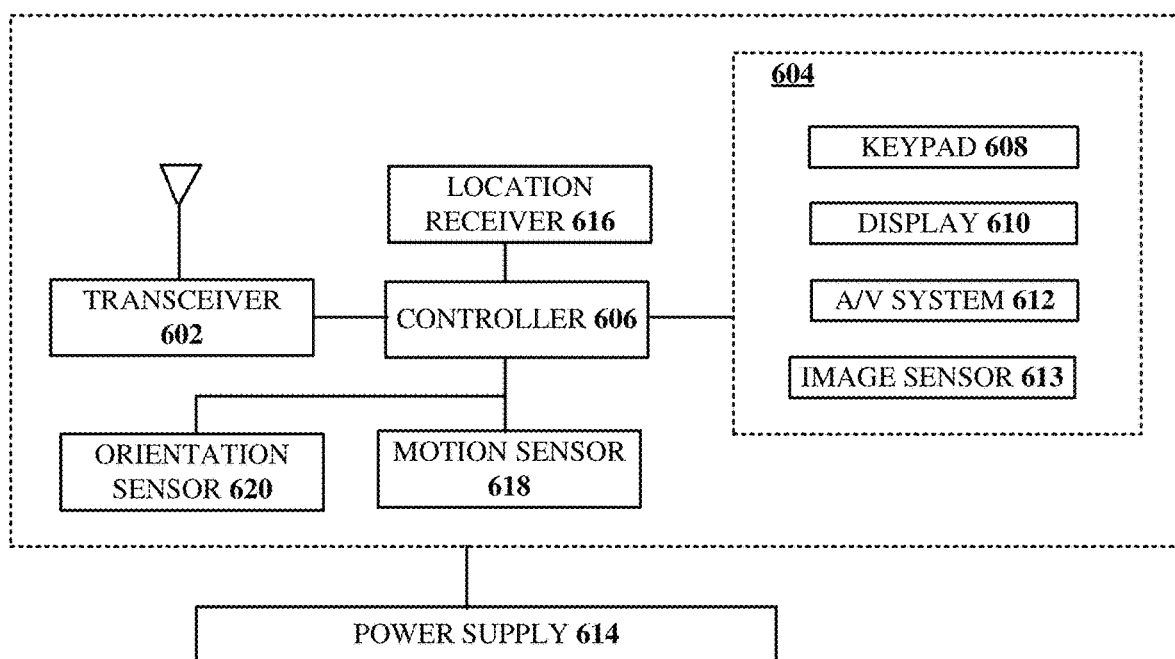
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part collecting or otherwise accessing information indicating connection patterns such as IP addresses being utilized by communication devices for communication services over a time period, where communication devices use a same credential of a single account for accessing the communication services. Hubs can be identified according to groups of the communication devices that exhibit a particular sharing pattern such as having used the one or more common IP addresses. A prediction or estimation that the single account is engaging in sharing activity can be made based on an analysis of the hubs, such as based on a number of the hubs.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth©. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth©, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

Figure 7:
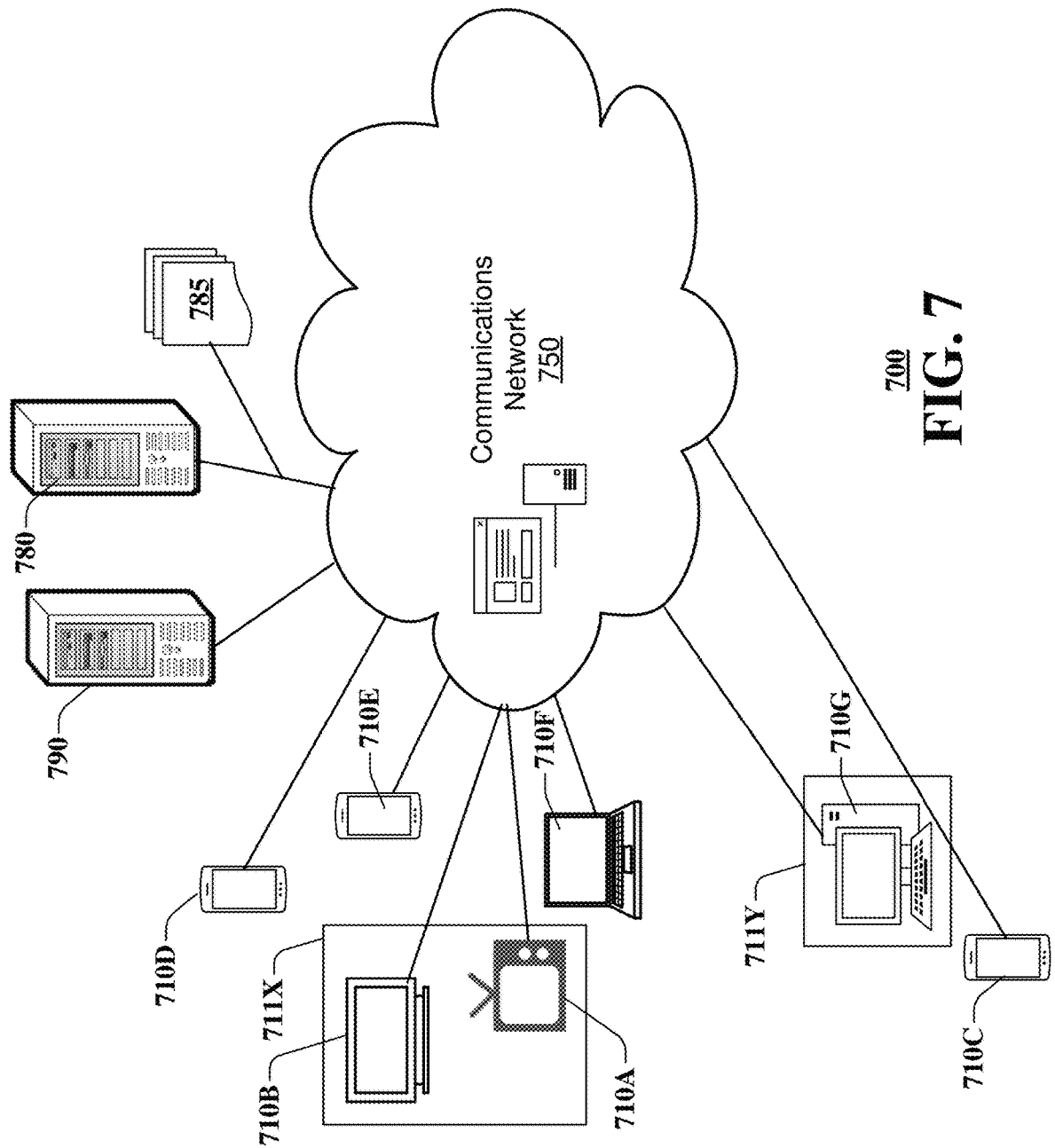
FIG. 7 is a block diagram illustrating an example, non-limiting embodiment of a system functioning within the communication network of FIG. 1 in accordance with various aspects described herein.

Referring now to FIG. 7, a block diagram is shown illustrating an example, non-limiting embodiment of a system 700 in accordance with various aspects described herein. In one or more embodiments of system 700, user behaviors associated with credential sharing can be profiled for a diverse set of businesses susceptible to account sharing. For example, an account sharing profiler 790 can be provided, which is used to score accounts on factors indicative of credential sharing behavior. A large set of factors can be considered from consumption, customer, and other data sources, and a learning program can be built or generated to weigh the importance of these factors such as from empirically inferred sharing structures. In one or more embodiments, features for these factors can be included at the level(s) of intended benefit unit(s) (e.g., household), which can be significant or critical to identifying sharing behaviors across benefit units. In one or more embodiments, the account sharing profiler 790 can provide a current- and/or near-term sharing propensity score for each account, that is validated on sharing outcomes.

In one or more embodiments, businesses or other entities can use this score to rank accounts and/or classify the accounts (e.g., into different severity categories), and deploy customized interventions or mitigation action(s) in a targeted fashion. For example, the score can also be highly interpretable, facilitating account management and effective intervention design. In another embodiment, the account sharing profiler 790 allows businesses or entities to further determine or investigate the nature of sharing for any account, e.g., is the sharing occasional, persistent and stable, on a path to fraud, etc. The nature of the sharing can be determined, identified or otherwise characterized according to various factors including timing data (e.g., how often, what time of day or day of week, how much content, etc.); location data (e.g., dormitory vs. multiple homes owned by account holder vs. multiple homes in same neighborhood); type of content being shared (e.g., a special broadcast event vs scheduled episodes vs online educational classes vs same genre of content vs correlated genre of content); and so forth. The method and system enables businesses or entities to segment customer groups with different sharing natures and needs. These insights help businesses develop and gauge market/impact for targeted treatments, offers, strategies, and products.

In one or more embodiments, system 700 enables services, such as online, electronic or communication services, to be provided to various communication devices. As an example, a server 780 operated by a business or entity such as a content provider, e-commerce provider, service provider, or other entity can provide various types of services including e-commerce, voice, video, data and/or messaging. For example, the server 780 can be utilized for entertainment services (e.g., streaming and/or interacting with various contents such as music, podcasts, concerts, audiobooks, shows, movies, or games such as OTT services); instructional services (e.g., online fitness, online tutoring, online courses, textbook rental, virtual conferences); utility services and software (e.g., online banking services, conferencing software, financial/tax software); purchasing services (many of which have both online and physical versions for their services); and/or privileges designed by many businesses (e.g., benefits, discounts, trials, gifts, or events for VIPs, employees, loyal customers, etc.).

For example, one or more servers 780 (only one of which is shown) can provide online services 785 through use of access portals via a communications network 750. In one embodiment, the online services 785 are provided utilizing accounts which require credentials for access, such as usernames (or other account identifiers) and passwords. For instance, a single account can have a credential that includes a username and password, where the credential can be utilized at more than one access portal and/or by more than one device to access the services (at different times and/or simultaneously).

In one or more embodiments, system 700 enables a process to be implemented for profiling sharing activity associated with a single account. This process can be performed for any number of accounts and/or performed for more than one online service.

As an example, the server 790 (or the server 780 managing the service) can perform the profiling process. For instance, from usage data of each account, access portals can be grouped by common occurrences of location signifiers. Access portals could be any means through which the user access the content, such as with a unique identifier, e.g., TV, personal computers, mobile devices, virtual reality devices, etc. The identifier could also come via phone numbers, physical presence, device authentications via fingerprint, password, facial recognition, etc. Location signifiers can also take many forms, e.g., IP addresses, GPS locations, cellular locations, camera footage, physical presence, etc. In one embodiment, hubs can be identified according to the groups of communication devices that have used the one or more common IP addresses. In one embodiment, hubs can be adjusted according to intended benefit unit. For example, if the intended benefit unit is an individual, hubs can be broken down from households to individuals after the household hub is determined. A prediction that the single account is or may soon be engaging in sharing activity can be made based on the adjusted hubs. Profiling of sharing factors can be performed for the accounts, such as based on a learning model. The profiling can be used for a number of actions, including mitigation actions and strategies.

The communications network 750 can provide broadband access over access portals to data terminals via an access terminal, wireless access to a plurality of mobile devices and vehicles via base station or access point(s), voice access to a plurality of telephony devices, via switching device(s)

and/or media access to a plurality of audio/video display devices via media terminal(s). In addition, the system 700 can include one or more content sources of audio, video, graphics, text, gaming and/or other media or information.

As an example, system 700 can function within the communication network 100 of FIG. 1 in accordance with various aspects described herein. System 700 can include various devices that facilitate providing a connection through access portals to online services including communication devices 710A-710G (collectively referred to as 710), which can be of various types including mobile devices, stationary devices, smartphones, set top boxes, media processing devices, gaming consoles, televisions, desktop computers, laptop computers, personal digital assistants, or other computing devices that can present communication services to a user. The access portals can be connected with (e.g., via the communication devices of system 700) from various locations (e.g., residence, business premises, schools, public premises such as a library, retail premises such as an internet café, travel facilities such as an airport, outdoors and so forth) such as a single or multiple access portals via communication devices 710A, 710B at location 711X, an access portal via communication device 710G at location 711Y. Also, the locations of some of the access portals or communication devices of system 700 can change such as for mobile phones, laptop computers, other mobile devices, and so forth. Any number of communication devices can be included in system 700.

As part of the use of system 700, users or customers often leave behind (or otherwise make available for monitoring) different types of information: time (e.g., timestamp, duration, session); location (e.g., IP addresses, GPS locations, cellular locations, physical locations); access portal (e.g., device identifiers, cellular numbers, account or sub-account numbers) and/or consumption content (e.g., which benefit to be consumed, historical record of consumption). Some or all of this information can be utilized in profiling credential sharing as described herein. However, customers are often not required to explicitly identify or prove who they are. It is often not so straightforward to infer who is behind each consumption, as users often have and share multiple access portals, and consume a diverse set of content at a wide range of times and locations. System 700, through use of account sharing profiler 790, can facilitate (and/or can be critical to) understanding, characterizing and addressing account sharing, and can mitigate (e.g., as compared to contemporary systems): loss of revenue based on failing to capture revenue from parties who are impermissibly sharing and not paying; compromised personal data security which could result in identity theft for example; and/or violations for various user and business agreements, e.g., copyright and content distribution agreements where businesses may be obliged to know or track who is consuming benefits.

In one or more embodiments, system 700 enables determining: whether any given account is sharing credentials; the particular structure of sharing for a given account (e.g., the number of different benefit units using the account, the particular usage belonging to a particular benefit unit, and any usage which does not belong to the subscribing benefit unit); a particular account's current or near-future propensity for sharing; account rankings based on the severity of this propensity; account categorizing into severity categories such as not sharing, casual sharers, high-risk sharers, and suspected fraud; ranking and categorization that allows businesses to deploy customized intervention strategies in a targeted fashion; the nature of sharing for a particular account such as if the sharing is occasional, persistent and stable, on a path to fraud, or driven by special benefits or contents, etc.; different types of sharing and how they are distributed in the customer base which can be especially helpful for businesses to understand accounts with moderate sharing (e.g., while non-sharers and fraudulent/excessive sharers may be easy to identify and address, accounts in between these two extremes (often a group substantial in number) can require more understanding of their motivations and preferences, in order to design appealing and effective interventions); trends in the distribution or prevalence of the different types of sharing; and/or impact of any intervention strategy (e.g., predicting or determining the size of a customer segment that is most likely to respond positively to any intervention strategy and/or predicting or determining risk of losing existing subscribers as a result of the intervention).

In one or more embodiments, system 700 enables leveraging advanced intelligence on the sharing structure. For example, the household partition algorithm for OTT services described with respect to FIGS. 2A and 2B can be extended at least in part to: (1) partition other intended benefit units (e.g., individual or community) and/or (2) a wider set of businesses or entities susceptible to account sharing. Continuing with this example, the methodology described herein can be further extended by 1) utilizing a broader set of location signifiers (e.g., GPS locations, cellular locations, physical locations etc.) and/or 2) utilizing a broader set of access portals (e.g., account/sub-account numbers, fingerprint, facial recognition, etc.). In one or more embodiments, a determination as to important factors can take supervision from benefit unit partitions. This partitioning can effectively quantify a degree of sharing which would be a difficult and inefficient task to try to obtain at scale for such quantifications without utilizing one of the exemplary techniques described herein. Without such a supervision signal, a purely unsupervised selection of factors may not yield accurate results tied to, or validated on, sharing outcomes. The factors being considered include information at the benefit unit level, e.g., intra-/inter-unit statistics, and how unit partition evolves through time. These unit-level factors can be significant or crucial in providing signals and information about the nature of sharing across benefit units. An overly macroscopic view (e.g., account-level) or an overly microscopic view (e.g., access-portal- or location-level) may not be able to provide accurate signals and information from different benefit units.

Figure 8:
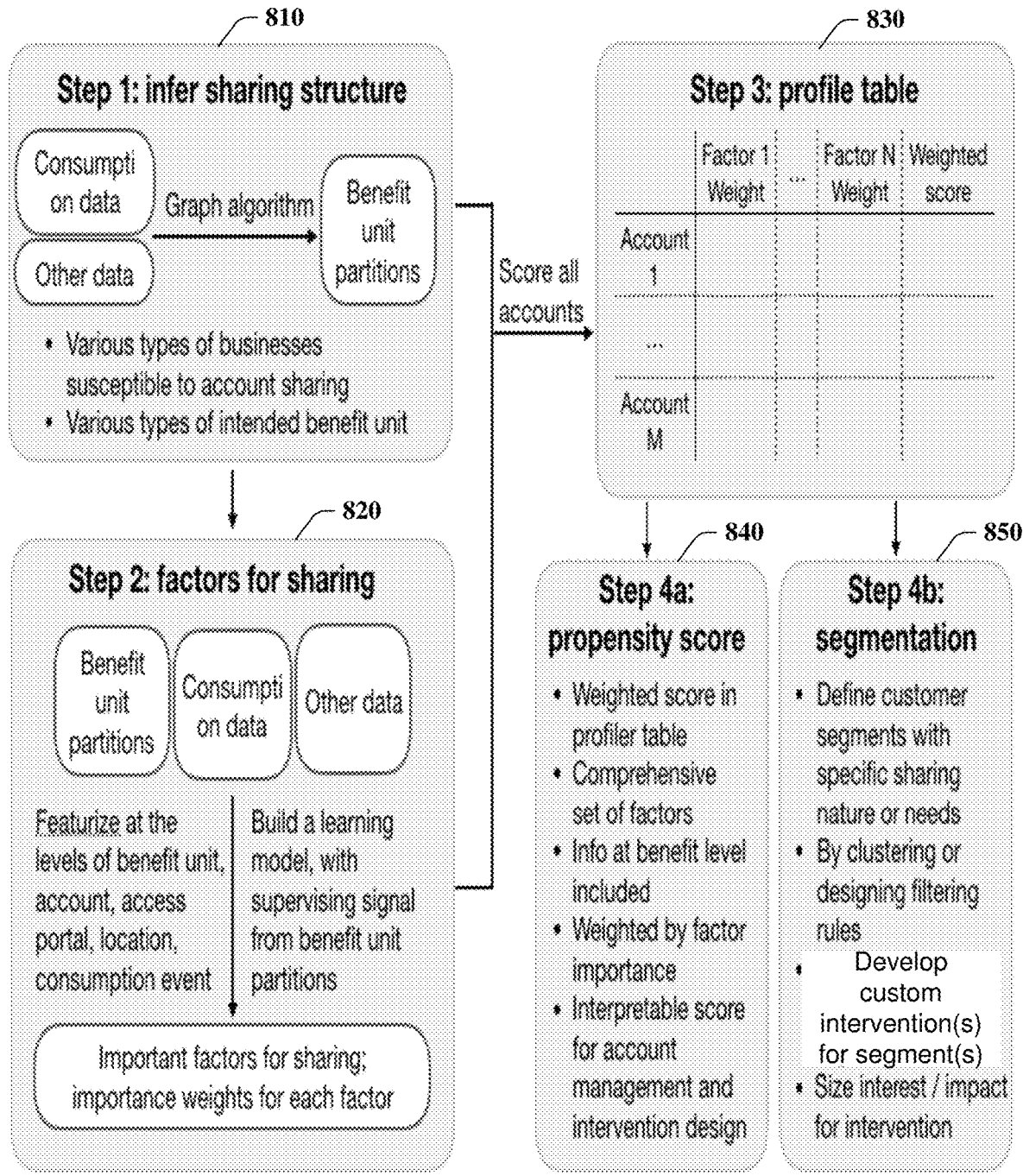
FIG. 8 depicts another illustrative embodiment of a method in accordance with various aspects described herein.

Referring additionally to FIG. 8, a method 800 is illustrated that can be performed in system 700, as well as according to other embodiments described herein, which can profile customers' sharing behaviors and can utilize the profiled information for various actions including mitigation steps. At 810, a sharing structure can be inferred. For example, inferring the sharing structure for each account can be based on grouping access portals into inferred benefit units. In one embodiment, from the usage/consumption data, a graph or other representation can be generated for each account by grouping access portals by common occurrences of location signifiers. Other data can also be utilized in this determination, including social media information. Access portals can be various devices, technologies and means through which the user accesses the content or service, which can be via a unique identifier, e.g., television, personal computers, mobile devices, virtual reality devices, etc. FIG. 8 illustrates a graph algorithm being utilized to generate the benefit unit partitions, however, other algorithms and methodologies can also be utilized which may or may not rely on graphical analysis of the data, such as growing a list or grouping algorithms.

In one embodiment, the identifier can also be based on phone numbers, physical presence, device authentications via fingerprint, password, facial recognition, etc. Location signifiers can also take various forms, e.g., IP addresses, GPS locations, cellular locations, camera footage, physical presence, etc. In one embodiment using a graph algorithm, the access portals of a given account can be set as nodes. For example, if two access portals have been observed to use at least one common location, an edge can be added to these two nodes. The graph can be generated using all usage records from a predetermined time window. For instance, each connected component of the graph can consist of a hub. In this example, a hub of access portals can be inferred or estimated to be from the same household, since it is observed in this instance that this group of access portals connect with the same group of locations. In one embodiment, different hubs do not share any access portals or any location at all, and they are suspected of being from different households.

In one embodiment, adjustments can be based on intended benefit unit. For example, if the intended benefit unit is an individual, hubs can be broken down from households to individuals after the household hub graph is complete. In an example, if more than one access portal within a household hub is observed at the same time at different locations (usage or presence), any edge among them can be deleted and these groups of access portals can be broken into separate individual hubs. In one embodiment, if the intended benefit unit is a community, such as a school, a company or a business establishment, a set of locations can be pre-defined (e.g., known to be locations for each member of the community), as one single location, before implementing the graph-based algorithm. In one embodiment, pre-defining of locations can be based on a particular business model being employed, such as a software service being offered to an entire university, then the university could supply a list of IP addresses (or other location-based data) that is authorized to use the service (or that belong to the university). In one embodiment, the pre-defined information can be location-based and/or non-location-based, such as IP addresses, GPS coordinates, geographic proximity to a point (or to each other), relationships between users, and so forth. In one embodiment, the pre-defined information can be supplied such that the intended benefit units can be detected using the pre-defined information as a criterion. In one embodiment, the pre-defined information can be a census block, a zip code, or some other geographic data that is location-based. In one embodiment, the pre-defined information can be based on memberships or affiliations with certain groups, such as belonging to a same fitness facility. In one or more embodiments, a combination of location-based and non-location-based pre-defined information can be utilized in the profiling, such as a census block and membership at a same gym.

In another embodiment, a household's multiple locations (e.g., primary residence and vacation homes) can be connected and treated as a single location. In another embodiment, the set of locations for the intended benefit unit can be dynamically configured, such as analyzing potential new locations to be added or excluded from the community based on various information including identified correlations between the locations, correlations between the devices at the locations, and so forth.

In one embodiment, the benefit unit assignment can be performed in multiple ways for a given application. For example, multiple sharing structures can be applied, such as developing both an individual-level and a household-level sharing structure for an application. Some applications may have tiered, mixed, complex, or unclear benefit unit intentions or definitions, and could benefit from a multi-layered sharing structure inference.

In one embodiment, customization of the graph algorithm can be performed. For example, access portals can be connected only if: they have been seen to use common locations more than once, they each have non-trivial amount of usage, or they are both seen at certain qualifying locations. In one embodiment, a measure of strength, or weight, can be associated to each edge, based on factors such as number of days with co-occurrence, or combined usage volume, etc. A composite strength profile can then be devised for each hub, which could be used to further adjust the sharing structure.

In one or more embodiments, adjustments can be based on other information. For example, other information or data collected about the usage or users can be used to fine-tune the output graph: location type such as known home locations, work locations, commute, and travel patterns of individuals can help ascertain whether different hubs are indeed from different benefit units; characteristics of locations, e.g., private residences, public restaurants, college dorms, known IP VPN lists etc., can also help judge the nature and weigh the reliability of connection among access portals. For instance, if two access portals are connected because they are seen at the same private home, they can be determined to be more likely to belong to the same household, versus if they are seen at the same large train station.

In another embodiment, access portal type can be the basis for adjustments, determinations or confirmations to the algorithm. For example, the presence of stationary, non-mobile, or special-type devices (such as media consoles or large conferencing systems) in different hubs can facilitate confirming that these hubs are from different benefit units, if a benefit unit is likely to only have one or few such access portals. In another embodiment, adjustments, determinations or confirmations can be based on concurrent and repeat viewing across hubs where the presence of this behavior can facilitate confirming that these hubs are from different benefit units. In another embodiment, adjustments, determinations or confirmations can be based on time-of-day behavior, such as very different patterns across hubs can facilitate confirming that these hubs are from different benefit units. In another embodiment, adjustments, determinations or confirmations can be based on geography, such as if hubs are consistently observed far away from one another in the same time period, then a confirmation can be deduced that they are from different benefit units. In another embodiment, adjustments, determinations or confirmations can be based on social media and contact information, such as if access portals are observed engaging in social media and/or contacting activities with different accounts, contents, patterns, and/or with minimal/no interaction across hubs etc., then that can be utilized as a factor or a confirmation that they are from different benefit units.

It should be understood that the process described herein to infer a sharing structure is not limited to a graph-based process, and can also be implemented in other ways or combinations of ways including via accumulating lists, or other data structures. Typically, a manual implementation is not possible, given the large volumes of access portals, locations, and other information in the usage/user data, the large number of accounts for a given business application, and the need to refresh or recompute such as every month.

At 820, a list of factors can be generated or determined that are indicative of being more or the most important for account sharing. For example, a wide range of factors can be considered from benefit consumption, customer, and other data sources. In one embodiment, a learning program(s) or model(s) can be utilized to learn what factors are most indicative of current or near-future sharing behavior for a customer base. In one embodiment, this learning can be customized for different subpopulations or segments of accounts, such as by demographic or regional groups. In one or more embodiments, a supervised or semi-supervised model(s) can be employed.

In one embodiment implementing the learning program, the partition of benefit units obtained at 810 can be incorporated as a supervising signal for different levels of sharing behavior. In implementation, a variety of supervised or semi-supervised models can be used. Also, other signals can be incorporated indicating degrees of sharing, such as signals from the data itself in a semi-supervised paradigm. In this example, the result generated at 810 can still remain as an important signal, without which a purely unsupervised selection or dimension reduction may not yield accurate results tied to or validated on sharing outcomes.

At 830, all of the accounts can be scored to output the profiler table. For example, the profiler 790 (FIG. 7) can output a profiler table, including all important factors considered at 820 along with a measure of the importance of these factors as weights obtained from the learning model at 820. For example for each account (or selected accounts), these values can be populated for these factors as shown in profile table 900 of FIG. 9. In one or more embodiments, the trained model(s) can be applied to accounts to predict the benefit unit partition. In one or more embodiments, the trained model(s) can be applied to accounts to determine a severity of sharing and a nature of the sharing. In one or more embodiments, the trained model(s) can be applied to accounts to identify the weight of particular factors that are indicative of sharing behavior.

In one embodiment at 840, sharing propensity scores can be generated or otherwise determined. For example, to obtain each account's propensity for account sharing, a weighted sum of its values can be computed for all factors, weighted by the respective importance of the factors. In one embodiment, this score can be used to rank accounts or classify them into different severity categories. In one embodiment, customized intervention strategies or actions can be deployed or otherwise implemented based on the ranking or classification. As an example, the computed score can be interpretable such that aspects of an account's behavior that lead to its score being high or low can be identified. This interpretability can facilitate account management and effective design of intervention strategies and actions. In one or more embodiments, multiple accounts can be involved in sharing and mitigation strategies can be selected to target only particular accounts, such as an account that is identified as more likely to comply with the mitigation action (e.g., sign up for a family/friends bundle).

In one embodiment at 850, the sharing nature of users can be analyzed in order to segment and gauge interest. For example, utilizing the profile table, different customer groups with different sharing natures or needs can be segmented. For instance, the profiler 790 (or another analysis device) can find segments by: clustering accounts on all or a subset of factors using various clustering algorithms, and/or designing filtering rules or thresholds for all or a subset of factors. For example, business rules can be defined and utilized in identifying the segments. Example segments can include occasional sharer driven by special benefits, egregious sharer on a path to fraud, seasonal sharer with dorm-like situation, persistent sharer with stable sharing parties, and other categories. Determining these clusters and segments can facilitate businesses or other entities developing targeted offers, strategies, and products, and can facilitate gauging the potential market or impact size for these decisions. As an example, different segments of accounts (e.g., different severity, nature, etc.) can be assigned different targeted offers, strategies, and products to facilitate managing sharing behavior. In one embodiment, the size of segments can be analyzed as part of a risk assessment in applying a particular mitigation strategy, such as identifying a segment size above a particular threshold and determining that a lower-level mitigation strategy (e.g., advertising bundles rather than providing a warning) is warranted.

Various factors can be populated into the profile table 900 of FIG. 9. As an example, the types of factors can be based on the type of service being provided, the type of businesses or entities providing the service, the intended benefit unit(s), and so forth. In one embodiment, factors can be derived from the monitoring of the consumption data and identifying particular correlations which may not have been considered a factor in the past. Profile table 900 illustrates a first factor which is the average number of benefit units in the last 6 months per account and the weight of this first factor; a second factor which is the percent consumption that is concurrent across the benefit units per account and the weight of this second factor; and an Nth factor which is sharing displays viral spread in Boolean per account and the weight of this Nth factor. As can be seen in FIG. 9, any number of factors can be identified.

In one embodiment for all factors, statistics are computed at the level of benefit unit, in addition to at the levels of account, access portal, location, and/or consumption event. For instance, statistics at the level of benefit unit can be significant or critical at providing signals and information about the nature of sharing across benefit units, whereas those factors at other more observable levels (e.g., account, access portal, location, and consumption event) may not be able to or may be more difficult to assess. For example, a sharing account and a non-sharing account may have similar numbers of devices, locations, overall consumption, but behaviors at the benefit unit level can be very different.

As an example, information can be derived from benefit unit partitions which can be based on or associated with historical benefit units such as features derived from time series of historical benefit units, moving average, trend, stability, and so forth. As another example, information derived from benefit unit partitions can be based on or associated with temporal evolution pattern such as determining whether the temporal evolution of benefit unit partition follows a particular pattern such as (a) viral spread in space and time, (b) seasonal/on and off sharing, (c) leaked/large-spike sharing, (d) household breakup, or (e) another pattern. As another example, information derived from benefit unit partitions can be based on or associated with hub edge weight such as co-location strength among access portals within each hub, as measured by a number of characteristics such as number of days with co-location, combined usage volume, and so forth.

As an example, information can be derived from consumption data which can be based on or associated with various metrics that can be computed as follows: (1) metric for account; (2) metric for each constituent benefit unit; (3) inter- and intra-unit metric medians and variations; (4) deviations of the metric from that of the main benefit unit or the core stable set for an account; and/or (5) how the metric evolves over time. Metrics can include determining hoppers: number, percent, and/or amount of consumption done by access portals that hop among more than one accounts. Metrics can include determining time of day: how well consumption times correlate across access portals and benefit units. Metrics can include determining geography: miles apart, number, percent, and/or amount of consumption done at different granularity of locale —country, state, city. Metrics can include determining concurrent consumption: amount of consumption concurrent across access portals and benefit units. Metrics can include determining repeat consumption: amount of consumption that is repeated across access portals and benefit units. Metrics can include determining access portals: number, number and percent outside of main benefit units, and/or number and percent deviation from core stable set. Metrics can include determining access portal type: number, percent, and/or amount of consumption done with portable vs non-portable portal/device, and/or personal vs shared access portals. Metrics can include determining locations: number, number and percent outside of main benefit units, and/or number and percent deviation from core stable set. Metrics can include determining location type: number, percent, and/or amount of consumption done at private vs public locations (and different types of public locations such as cafes, train stations, dormitories). Metrics can include determining consumption: amount, and/or percent outside of main benefit unit.

As an example, information can be derived from other data sources which can be based on or associated with social media and contacts data: evidence and strength of connections, contacts, interactions among access portals, and/or location match of close social connections or frequent contacts. As another example, information derived from other data sources can be based on or associated with demographic data: household income, household size, age, number of teenage/college-age children, and/or number of residences. As another example, information derived from other data sources can be based on or associated with location data: known home locations, work locations, commute, and travels, known characteristics of locations (e.g., residences, coffee shops, dormitories, train stations, etc.), and/or known VPN lists. As another example, information derived from other data sources can be based on or associated with content popularity: observed or predicted content popularity to adjust for propensity for sharing. In one or more embodiments, the methods and devices described herein can obtain and analyze other data to facilitate profiling of accounts such as information supplied by a subscriber or user including consumption habits and preferences, household (or other benefit unit) configuration, household (or other benefit unit) location(s), travel/commuter attributes, or other information that can affect observations and interpretations of the consumption and location data. In one or more embodiments, the methods and devices described herein can obtain and analyze feedback from offers or other customer/business interactions that inform or otherwise affect the profiling algorithm and methodology described herein. As an example, a password reset trial can be performed and analyzed as part of the profiling. In this example, households (or other intended benefit units) whose profile significantly changes following the password reset trial (e.g., a particular amount of reduction in number of hubs or locations) can be contrasted or otherwise compared with those that do not change (or change is below a threshold), which can be utilized to infer or validate sharing and its nature. In one embodiment, the method and device can generate tags or otherwise characterize behavior based on what occurs when a password request is implemented, such as a tag indicating that a particular type of behavior was demonstrated following a password reset request where this tag can be fed into the learning model or otherwise considered in the sharing determination for that customer or user.

In one or more embodiments a system and method are provided to enable sophisticated sharing propensity scoring. For example, the system and method consider a comprehensive set of factors from among at least consumption, customer, and/or other data sources. As another example, the system and method can be benefit-unit-focused such that information is utilized at the level of the intended benefit unit, which likely contains the most signal about sharing behaviors since sharing occurs across benefit units. One or more of the embodiments can be an improvement over only considering information at the levels of account, access portal, location or consumption event which may miss these critical or significant signals. As another example, the system and method can be validated by the factors being weighted by how indicative they are in predicting sharing. The weights can then be validated from empirical evidence and learnt from a learning model with supervision from the inferred benefit unit partitions. As another example, the system and method can be interpretable. The scoring is interpretable, facilitating or allowing deciphering which aspects of each account's behavior lead to its score being high or low. This allows or facilitates account management and effective treatment design.

In one or more embodiments a system and method are provided to enable customer/user segmentation and sizing. For example, the system and method allow or facilitate businesses segmenting and sizing different customer groups with different types of sharing, based on their sharing patterns, characteristics, and/or inferred needs. For instance, this segmentation can allow or facilitate businesses developing and designing a variety of treatments, offers, strategies, and/or products. The sizes of these segments can suggest potential impact (e.g., financial or other) of these intervention strategies. In one embodiment, this can be helpful for businesses to understand accounts with moderate sharing, which is often a group that is substantial in number with more sharers than non-sharers but less sharing than fraudulent/excessive sharers. This can often be a diverse group with varied motivations, preferences, and needs. Segmenting and profiling within this group allows and facilitates designing or selecting appealing and effective intervention or mitigation actions.

In one or more embodiments, an account sharing profiler enables a sharing propensity scoring system, as well as segmenting and sizing for different sharing behaviors such that the propensity scores can be computed from a comprehensive set of factors, with weights learned from empirical sharing outcomes to be indicative of sharing. In one or more embodiments, this scoring allows business to rank accounts and deploy different interventions to different score groups. In one or more embodiments, this scoring allows business to categorize accounts into populations of users with similar sharing severity, e.g., not sharing, casual sharers, high-risk sharers, and suspected fraud. This categorization can allow businesses to target specific groups, e.g., to impose restrictions or other mitigation actions to discourage excessive behavior by groups with severe sharing without jeopardizing the service experience (e.g., streaming) of non-sharing and casual sharing customers. The interpretability of the score can provide insights for intervention design and account management.

In one or more embodiments, the segmenting and sizing customers or users for different sharing behaviors that can be performed by the system and method described herein allows for identifying and sizing segments of different types of sharer based on their sharing patterns, characteristics, and inferred needs. For example, the segmenting/sizing can identify a few parties regularly sharing credentials; a few parties temporarily sharing credentials (e.g., possibly due to special benefit); sharing with many access portals that change frequently (e.g., suggesting a dormitory environment or other situations where credential sharing spreads; currently engaging in or on a path towards systematic fraud/account takeover; an account that is not sharing, but rather has very unusual consumption habits).

In one or more embodiments, the segmenting and sizing of customers or users for different sharing behaviors that can be performed by the system and method described herein allows for or otherwise facilitates developing targeted offers, strategies, and/or products that can be tailored to inferred consumer needs and nature of sharing. In one embodiment, a selection of a mitigation strategy can be based on a risk assessment including a risk that the sharing behavior will worsen and/or a risk that a particular mitigation strategy will lead to unintended consequence such as a subscription cancellation. In one embodiment, the selection of a mitigation strategy from among a group of strategies can be based on a determined severity of the sharing and/or a determined nature of the sharing.

As an example, the method provides for generating customized plans such as tiered price plans for different levels of sharing, family and friends plans, etc. As another example, the method provides for new user identification such as identifying sharers who may opt to purchase their own subscription if a referrer reward is offered. As another example, the method provides for a gentle alert such as notifying a customer or user when new benefit unit patterns emerge, to make sure these are authorized. As another example, the method provides for a serious alert such as notifying a customer or user, and can include restricting service when more alarming, high risk patterns emerge. As another example, the method provides for a traveler focus such as identifying accounts with likely travelers, which can then facilitate marketing of special offers, accessories, portals to make out-of-home consumption easier, and can be linked with in-home consumption for virtual shared consumption. As another example, the method provides for recognizing multi-location environments such as identifying accounts that likely belong to the same unit but consistently have two or more different locations and access portal sets. In this example, the method further provides for creating customer offers, accessories and so forth to make cross-location consumption more convenient and seamless. As another example, the method provides for virtual consumption parties such as targeting special portal/method/accessory that enables group consumption from multiple locations. For instance, this can target the occasional sharer and can charge a fee for this option while notifying the customer or user subtly that the account is being used for sharing and watching the same content. In one embodiment, the system and method described herein facilitates detecting and characterizing sharing, and selecting a mitigation strategy for those instances where the sharing is not permitted, such as providing advertising for family/friends bundle packages so that the sharers are aware that there are other options available.

One or more of the embodiments described herein (alone, in combination, in whole and/or in part) can be applied to any environment (e.g., business, school, and so forth) susceptible to account sharing, and can infer a sharing structure for the account(s). Accounts can be scored or categorized by sharing propensity and can be segmented by different sharing nature and sharing-related needs which is an improvement over current technology that analyzes account sharing. In one embodiment, the search for factors indicative of sharing can be supervised by a benefit unit partitioning such that this supervision allows for accurate results tied to, or validated on, sharing ground truths. The factors that are being considered, analyzed or detected can also make use of these partitions and can be computed such as unit-level statistics, intra-/inter-unit statistics, unit evolution through time. In one or more embodiments, these unit-level factors can be significant or critical in providing signals and information about the nature of sharing across benefit units, where factors at other more observable levels (e.g., account, access portal, and location) may not be able to.

In one or more embodiments, propensity scores and/or profile tables can be generated (and/or updated) at a particular frequency for the accounts (or a portion thereof) such as on a monthly basis where the generating and/or updating takes into account the latest usage/consumption data and/or other information utilized for collecting the information and applying the learning model. In one embodiment, the learning model(s) can be built utilizing existing data and applied on a periodic basis (e.g., monthly) to the accounts, and then after a longer-period the learning model can be retrained and again applied on the periodic basis (e.g., monthly) to the accounts. In one embodiment, particular events (e.g., acquisition of a content provider, merger, and so forth) and/or particular monitored results (e.g., outside of a threshold) can trigger retraining of the learning model. In one or more embodiments, different trained models can be utilized for different service types (e.g., streaming content vs. online education) and/or different intended benefit units. In one or more embodiments, the particular model(s) being employed can depend on the collected data, such as text only as opposed to images. In one or more embodiments, the selection of a supervised vs a semi-supervised model(s) can depend on the collected data. In one or more embodiments, other data utilized in step 810 along with the consumption data can include network status data (e.g., traffic, maintenance outage, data speed), content popularity, geographical information, and so forth.

In one or more embodiments, the methods and systems described herein can be applied to e-commerce where accounts allow for discounts or other rewards/advantages and users may be sharing accounts to obtain the discounts or rewards/advantages. In this example, the embodiments enable characterizing the sharing, such as where the intended benefit unit is a household, and the methods and systems can profile the account to identify sharing and its nature according to the various data, criteria, factors and analysis described herein. In one or more embodiments, the methods and systems can apply various business rules to the account and/or to the type of sharing that is detected, such as allowing sharing where no improper discounts are being applied, allowing sharing where any improper discounts are under a threshold, or taking mitigation action towards the sharing behavior where the improper discounts are above a threshold. In one or more embodiments, purchasing, reviewing and/or other user interactions can be analyzed to facilitate the characterizing of the sharing, the profiling of the account and/or selecting mitigation actions. As an example, items that are not typically purchased in multiples (e.g., cars, turkey at thanksgiving, etc.) can be an indicator of sharing behavior. As another example, items with a high profit margin that are being purchased via improper sharing may warrant a lesser mitigation action than items with a lower profit margin.

In one or more embodiments, the methods and systems described herein can be applied to online exercise sessions where users may have individual accounts (or families may have group accounts) but other users may be sharing those accounts. In this example, the embodiments enable characterizing the sharing, such as where the intended benefit unit is an individual, and the methods and systems can profile the account to identify sharing and its nature according to the various data, criteria, factors and analysis described herein. In one or more embodiments, the methods and systems can select particular mitigation actions according to the characterized severity of the sharing such as: offering a bundle where the determined sharing is below a threshold (e.g., based on number of users and/or amount of shared online access time in session); providing a warning where the determined sharing is below a second threshold (e.g., based on number of users and/or amount of shared online access time in session); and contacting the account holder to investigate and/or cancelling an account where the determined sharing is above the second threshold (e.g., based on number of users and/or amount of shared online access time in session). Other factors including determining relationships between users (e.g., based on names, locations, social media data, demographics, etc.) can also be taken into account for determining mitigation actions, such as determining that all of the users are likely in a same family and offering a family bundle to the account as opposed to determining that each of the users is likely not in same family and providing a warning regarding improper sharing to the account holder.

In one or more embodiments, the methods and systems described herein can be applied to travel/hotel/vacation/hospitality industries. For example, particular accounts may allow for group discounts or other rewards/advantages and users may be sharing an account to obtain the discount or other rewards/advantages. In this example, the methods and systems can profile the account to identify sharing and its nature according to the various data, criteria, factors and analysis described herein. For instance, in a hotel booking website, the intended benefit unit can be a household or a group of friends/family, and the methods and systems can determine whether the account is being used within that intended benefit unit or whether the sharing goes beyond, such as unacquainted users reusing the same account to obtain a group rate. In one embodiment, purchase or reservation data (e.g., location of the room rental or airline destination, time period of the room rental or airline flight, etc.) can be analyzed to facilitate characterizing the nature of the sharing, such as an account with an intended benefit unit of a household renting rooms in separate cities at a same time may be an indicator of improper sharing. In this example, the hotel may give group discounts for renting multiple rooms and the methods and systems may determine that due to the rentals at different hotels in different cities at a same time, there may be improper sharing of the account and there may be improper use of the group discount. In one or more embodiments, the methods and systems can apply various business rules to the account and/or to the type of sharing that is detected, such as where the terms of the purchase do not allow for sub-lessors and the system determines that the sharing will result in a violation of those terms. In one or more embodiments, the methods and systems can facilitate implementing other business rules to the account and/or to the type of sharing that is detected, such as preventing or limiting re-sale of items at a premium (e.g., renting a block of hotel rooms or buying a block of sports event tickets) if such purchases are not permitted by the enterprise (or are not permitted by local laws or regulations).

In one or more embodiments, the methods and systems described herein can be utilized to detect sharing and characterize the nature of the sharing in the context of employee human resource accounts. For example, an intended benefit unit may be individual (e.g., the employee) such as where confidential information is accessible. As another example, the intended benefit unit may be family (e.g., members of the family accessing health insurance benefits information). In these examples, the business can dictate the intended benefit unit for access, such as online, to the particular information, and the methods and systems described herein can then detect sharing and characterize the nature of the sharing utilizing the various steps and functions described herein.

In one or more embodiments, the methods and systems described herein can be utilized to detect sharing and characterize the nature of the sharing in the context of online education. For example, the intended benefit unit may be the particular student and improper sharing by other students may be determined utilizing the various steps and functions described herein. In another embodiment, the methods and systems described herein can be utilized in the context of online testing. For example, in addition to or in place of visual identification of the student, one or more of the various steps and functions described herein can be used to learn information regarding or associated with the student and then allow the student to take the test where the learned information and the information at the time of taking the test are consistent with the identity of the student (e.g., based on the profiling of student account(s), such as location information, timing information, and so forth).

In one or more embodiments, the methods and systems described herein can be utilized to detect sharing and characterize the nature of the sharing in the context of retailers, such as big-box retailers that require membership. For example, the retailer may provide a discounted travel package based on a membership subscription and the methods and systems can be applied to detect whether the account is being shared and whether the discounted travel package is being improperly used.

In one or more embodiments, the methods and systems described herein can be utilized to detect sharing and characterize the nature of the sharing in the context of communication service providers, such as mobile communication service. For example, the service provider may provide a family discount and the methods and systems can be applied to detect whether the account is being improperly shared outside of the family. In one embodiment, location-based information, such as a subscriber's home location, IP address and/or a home tower being utilized, can be analyzed to characterize the nature of sharing of the account, such as detecting whether various devices utilizing the account are utilizing the same home tower where the intended benefit unit is a household. In another example, if the different devices are utilizing different home towers, the methods and systems can check whether the users of the devices are possible students away at school or parents of the subscriber and so forth. Various data can be analyzed to make these determinations including demographics, user names, social media data, contact information, and so forth.

In one embodiment, the methods and systems described herein can identify or infer different users of the account having different last names. This can trigger further evaluation of the account for potential improper sharing. For instance where the intended benefit unit is a household, siblings could have different last names. In this example, other data, such as location information, social media data, contact information, demographics, and so forth, can be analyzed to further evaluate whether the users are siblings and whether they are considered to be within a same household.

In one or more embodiments, the methods and systems described herein can be utilized to detect sharing and characterize the nature of the sharing in the context of organizations or interest groups, such as clubs, American Association of Retired Persons (AARP), American Automobile Association (AAA), alumni groups, and so forth. For example, the organizations or interest groups may provide a discount or other rewards/advantages as a result of membership which can be applied to the purchase of products or services, and the methods and systems can be applied to detect whether the account is being improperly shared outside of the intended benefit unit (e.g., the member or the member's family), which as described herein can be designated by the particular organization or interest group (and/or in this example by the vendor of the products or services being purchased).

In one or more embodiments, the methods and systems described herein can be utilized to detect or infer abnormal behavior with respect to vendor rules. Based on the account profiling and the analysis of various data described herein, the methods and systems can then identify vendor terms being breached based on detecting or inferring the abnormal behavior (e.g., same account purchasing blocks of tickets at multiple stadiums for sporting events occurring on same date where the vendor does not permit re-selling of tickets or where the vendor discount is limited to family members).

In one or more embodiments, different businesses in the same or different industries (e.g., different online vendors within e-commerce) can have different rules, and those rules can be analyzed and can be used as criteria as to how the system categorizes the nature of the account sharing, such as sharing to obtain a discount under a threshold can be considered low severity while sharing to resell at a premium can be characterized as severe.

In one or more embodiments, the methods and systems described herein can be applied to sharing of an internet account or WiFi access, such as students in a school or residing in a dormitory. The determination and characterization of the nature of sharing can be based on the intended benefit unit, such as whether it is for individuals, students in a particular club, students in a particular grade, students residing in a same building, all students, and so forth.

In one or more embodiments, the methods and systems described herein can be applied to an account for cloud computing access and/or cloud data storage. For example, the cloud service provider can provide business rules that dictate number of accounts, number of users of accounts, terms of use, and so forth. These rules can be utilized in the determination and characterization of the nature of sharing based on the intended benefit unit (e.g., derived from the business rules).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining, and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches, and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner that can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
monitoring over a time period for an account of a service, by a processing system including a processor, consumption data for access portals and corresponding location information for each of the access portals that are used to access the service using the account;
determining, by the processing system and based at least on the location information, groups of the access portals according to the monitoring;
adjusting, by the processing system, the groups according to an intended benefit unit for the service;
determining, by the processing system, a sharing structure including benefit unit partitions for the account based on the adjusting;
determining, by the processing system and based on the benefit unit partitions, factors indicative of account sharing by applying a learning model to the consumption data;
determining, by the processing system using the learning model, weights for the factors;
computing, by the processing system, a weighted sum of the factors;
determining, by the processing system, a severity category for the account according to the weighted sum of the factors; and
selecting, by the processing system, an intervention strategy from a group of intervention strategies according to the severity category.

2. The method of claim 1, comprising:
repeating, by the processing system for a group of accounts, the monitoring, the determining the groups, the adjusting the groups, the determining the sharing structure, the determining the factors, and the determining the weights for the factors; and
clustering accounts of the group of accounts according to one or more of the factors by using a clustering algorithm, applying filtering rules to all or a subset of the factors, or a combination thereof.

3. The method of claim 2, comprising determining filtering thresholds for one or more of the factors.

4. The method of claim 2, comprising determining targeted offers for the group of accounts.

5. The method of claim 1, wherein the determining the groups of the access portals is further based on other data including at least one of the consumption data, social media information, contacts information, demographic information, content popularity, or a combination thereof, and wherein the intended benefit unit for the service is one of an individual, a household, a business entity, a school, or a community.

6. The method of claim 1, wherein the service comprises an entertainment service, an instructional service, a hospitality service, an exercise service, a utility or software service, an e-commerce service, or a business privilege, and wherein the adjusting the groups is based on a type of device implementing the particular one of the access portals.

7. The method of claim 1, wherein the adjusting the groups is based on a characteristic of a location of the location information.

8. A device, comprising:
a processing system including a processor; and
a memory that stores executable instructions that, when executed by the processing system, facilitate performance of operations, the operations comprising:
accessing consumption data for access portals and corresponding location information for each of the access portals that are used to access a service using an account over a time period;
determining, based at least on the consumption data and the location information, groups of the access portals;
adjusting the groups according to an intended benefit unit for the service;
determining a sharing structure including benefit unit partitions for the account based on the adjusting;
determining, based on the benefit unit partitions, factors indicative of account sharing and weights for the factors by applying a learning model to the consumption data; and
selecting an intervention strategy from a group of intervention strategies according to the factors and the weights for the factors.

9. The device of claim 8, wherein the determining the groups of the access portals is further based on other data including at least one of social media information, contacts information, demographic information, content popularity, or a combination thereof, and wherein the operations further comprise:
determining a severity category for the account according to a weighted sum of the factors.

10. The device of claim 8, wherein the operations further comprise:
repeating, for a group of accounts, the accessing, the determining the groups, the adjusting the groups, the determining the sharing structure, the determining the factors, and the determining the weights for the factors; and
clustering accounts of the group of accounts according to one or more of the factors by using a clustering algorithm, applying filtering rules to all or a subset of the factors, or a combination thereof.

11. The device of claim 8, wherein the operations further comprise determining filtering thresholds for one or more of the factors.

12. The device of claim 8, wherein the operations further comprise determining targeted offers for the group of accounts.

13. The device of claim 8, wherein the intended benefit unit for the service is one of an individual, a household, a business entity, a school, or a community.

14. The device of claim 8, wherein the adjusting the groups is based on a type of device implementing the particular one of the access portals.

15. The device of claim 8, wherein the adjusting the groups is based on a characteristic of a location of the location information.

16. A non-transitory machine-readable medium, comprising executable instructions that, when executed by a processing system including a processor, facilitate performance of operations, the operations comprising:
determining, based at least on consumption data and location information, groups of access portals, wherein the consumption data and the location information correspond to a time period in which the access portals are used to access a service using an account;
adjusting the groups according to an intended benefit unit for the service;
determining a sharing structure including benefit unit partitions for the account based on the adjusting;
determining, based on the benefit unit partitions, factors indicative of account sharing and weights for the factors by applying a learning model to the consumption data; and
selecting an intervention strategy from a group of intervention strategies according to the factors and the weights for the factors.

17. The non-transitory machine-readable medium of claim 16, wherein the operations further comprise determining a severity category for the account according to a weighted sum of the factors, and wherein one or more of the determining the groups of access portals, the adjusting the groups, the determining the sharing structure or the determining the factors is based on a timestamp, connection duration, session information, IP address, GPS location, cellular location, physical location, device identifier, cellular number, account or sub-account number, benefit to be consumed, historical record of consumption, or a combination thereof.

18. The non-transitory machine-readable medium of claim 16, wherein the operations further comprise:
repeating, for a group of accounts, the determining the groups, the adjusting the groups, the determining the sharing structure, the determining the factors, and the determining the weights for the factors; and
clustering accounts of the group of accounts according to one or more of the factors by using a clustering algorithm, applying filtering rules to all or a subset of the factors, or a combination thereof.

19. The non-transitory machine-readable medium of claim 16, wherein the determining the groups of the access portals is further based on other data including at least one of social media information, contacts information, demographic information, content popularity, or a combination thereof, and wherein the operations further comprise determining filtering thresholds for one or more of the factors.

20. The non-transitory machine-readable medium of claim 16, wherein the intended benefit unit for the service is one of an individual, a household, a business entity, a school, or a community.

* * * * *